United States Patent [19]
Heindel et al.

[11] Patent Number: 5,812,794
[45] Date of Patent: Sep. 22, 1998

[54] METHOD AND APPARATUS FOR IMPLEMENTING DATA NETWORK SYSTEM HAVING OBJECT-ORIENTED ARCHITECTURE

[75] Inventors: Lee Edward Heindel, Bernardsville; Elizabeth Ann Gene, Basking Ridge; Barry Franklin Hoffner, Bound Brook; Vincent Alan Kasten, Fanwood; Refen Koh, Princeton; Thillastanam Krishnaswamy Ramaprasad, Shrewsbury Township, Monmouth County, all of N.J.

[73] Assignee: Bell Communications Research, Inc., Morristown, N.J.

[21] Appl. No.: 724,317

[22] Filed: Oct. 1, 1996

Related U.S. Application Data

[63] Continuation of Ser. No. 389,881, Feb. 17, 1995, abandoned.
[51] Int. Cl.⁶ ............... G06F 15/163; G06F 15/173; G06F 13/14
[52] U.S. Cl. ................ 395/200.36; 395/200.59; 395/683
[58] Field of Search .............. 395/200.03, 200.15, 395/200.31, 200.45, 200.68, 200.74, 200.77, 200.36, 200.82, 683; 370/401, 402

[56] References Cited

U.S. PATENT DOCUMENTS

| | | | |
|---|---|---|---|
| 5,280,610 | 1/1994 | Travis, Jr. et al. | 395/600 |
| 5,287,447 | 2/1994 | Miller et al. | |
| 5,329,619 | 7/1994 | Page et al. | 395/200.01 |
| 5,341,478 | 8/1994 | Travis et al. | 395/200.03 |
| 5,377,350 | 12/1994 | Skinner | 395/600 |
| 5,414,812 | 5/1995 | Filip et al. | 395/600 |
| 5,425,028 | 6/1995 | Britton et al. | 370/94.1 |
| 5,509,074 | 4/1996 | Choudhury et al. | 380/23 |
| 5,509,123 | 4/1996 | Dobbins et al. | |

OTHER PUBLICATIONS

R. Orfali et al.;Essential Client/Server Survival Guide;Chapter 9; "RPC, Messaging, and Peer–to–Peer";Van Nostrand Reinhold; ISBN 0–442–01941–6; pp. 119–128, 1994.

*Primary Examiner*—Mark H. Rinehart
*Attorney, Agent, or Firm*—Loria B. Yeadon; Joseph Giordano

[57] ABSTRACT

A data network system for communicating data between a plurality of data generating systems externally connected to the data network system and a plurality of application systems externally connected to the data network system The data network system provides source objects corresponding to the data generating systems and destination objects corresponding to the application systems. The destination objects defining processes performed on data provided to corresponding application systems. The data generating systems generate data to be collected. The data network system creates container objects to contain the collected data, and identifies a destination object from the container objects to receive the container objects. The data network system also processes the container objects in accordance with the processes defined by the identified destination object, and transmits data corresponding to the processed container objects to the application system corresponding to the identified destination object.

2 Claims, 21 Drawing Sheets

METHOD AND APPARATUS FOR IMPLEMENTING DATA NETWORK SYSTEM HAVING OBJECT-ORIENTED ARCHITECTURE

This application is a continuation of application Ser. No. 08/389,881 filed Feb. 17, 1995 now abandoned.

TECHNICAL FIELD

This invention relates to data networking systems and, more particularly, to methods for communicating data between data generating systems and applications that use the data. The invention facilitates the communication of data between the data generating systems and the applications by providing an object-oriented architecture that defines the necessary processes for this communication. The invention further facilitates the development of applications that use data from data generating systems.

BACKGROUND ART

Conventional data networking systems collect, track, analyze, and process data on events, and then route the data to various applications. For example, in the telephony industry, data networking systems collect data on calls in Call Data Records (CDRs), which are produced whenever a chargeable event occurs within a data generating system such as a central office switch. A chargeable event is, for example, completion of a call between a caller and a callee. A data networking system then routes the CDRs to Revenue Accounting Offices (RAOs) for use in various applications to, for example, bill customers for calls.

The volume of CDRs is expected to quadruple in the coming years. Keeping up with this increase has stimulated development of new approaches for processing CDRs. However, these new approaches suffer from shortsightedness and inflexibility because they provide for only one type of event, namely, the chargeable event for billing customers for calls.

The increase in volume of CDRs will be due in part to the development and implementation of new telecommunications networks called broadband networks, such as Broadband-Integrated Services Digital Network (B-ISDN), which can simultaneously transmit sound, video, and data. Broadband networks include functions based on new network resources such as multimedia hardware for mixing, combining, and transcoding sound, video, and data from different sources. Communication in these broadband networks will generate large numbers of new types of events (in addition to the chargeable events for CDRs) that will need to be processed. For example, a new event may be a content delivery event for the delivery of sound, video, or data along with information on the time required for the delivery and the distance between the content source and recipient. The new approaches for processing the increased CDRs fail to consider the growing need to process information on these new types of events that will occur in the new telecommunications networks.

The new approaches for processing CDRs also fail to consider certain advances in computer technology that permit widespread reuse of program code, which in turn reduces development time and effort for applications using the CDRs or records on other events occurring in the broadband networks.

DISCLOSURE OF THE INVENTION

Accordingly, the present invention is directed to methods for networking data using an object-oriented architecture that obviate one or more of the problems due to limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve the objects of this invention and attain its advantages, broadly speaking, this invention includes a data network system for communicating data between a plurality of data generating systems externally connected to the data network system and a plurality of application systems externally connected to the data network system. The data network system provides source objects corresponding to the data generating systems and destination objects corresponding to the application systems. The destination objects define processes performed on data provided to corresponding application systems. The data generating systems generate data to be collected. The data network system creates container objects to contain the collected data and identifies a destination object from the container objects to receive the container objects. The data network system also processes the container objects in accordance with the processes defined by the identified destination object and transmits data corresponding to the processed container objects to the application system corresponding to the identified destination object.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings:

FIG. 4 is a class diagram of communications classes,

FIG. 5 is a class diagram of source and destination classes,

FIG. 6 is a class diagram of data container and data location classes,

FIG. 7 is a class diagram of record classes,

FIG. 8 is a class diagram of a storage class,

FIG. 9 is a class diagram of program classes, and

FIG. 10 is a class diagram of state classes;

FIG. 12 is an object interaction diagram showing the interaction of objects of the classes during operation of the source data collection and safestoring component, and FIG. 13 is a timing diagram showing the timing for the object interaction in FIG. 12;

FIG. 14 is an object interaction diagram showing the interaction of objects of the classes during operation of the source processing component, and FIG. 15 is a timing diagram showing the timing for the object interaction in FIG. 14;

FIG. 16 is an object interaction diagram showing the interaction of objects of the classes during operation of the user program processing component, and FIG. 17 is a timing diagram showing the timing for the object interaction in FIG. 16;

FIG. 18 is an object interaction diagram showing the interaction of objects of the classes during operation of the destination processing component, and FIG. 19 is a timing diagram showing the timing for the object interaction in FIG. 18.

FIGS. 20 and 22 are object interaction diagrams showing the interaction of objects of the classes during two phases of operation of the destination transmission component, and FIGS. 21 and 23 are timing diagrams showing the timing for the object interaction in FIGS. 20 and 22, respectively.

BEST MODE FOR CARRYING OUT THE INVENTION

Reference will now be made in detail to the preferred implementation of the present invention as illustrated in the accompanying drawings. Wherever possible, the same reference numbers will be used throughout the drawings and the following description to refer to the same or like parts.

The present invention provides the capability for processing data from multiple data generating systems such as, e.g., central office switches used in the telephony business. The present invention also enables many types of applications to use the data from the data generating systems. These applications may include, e.g., processes for billing customers for a variety of types of telephone services.

A. Major System Components

Figure 1:
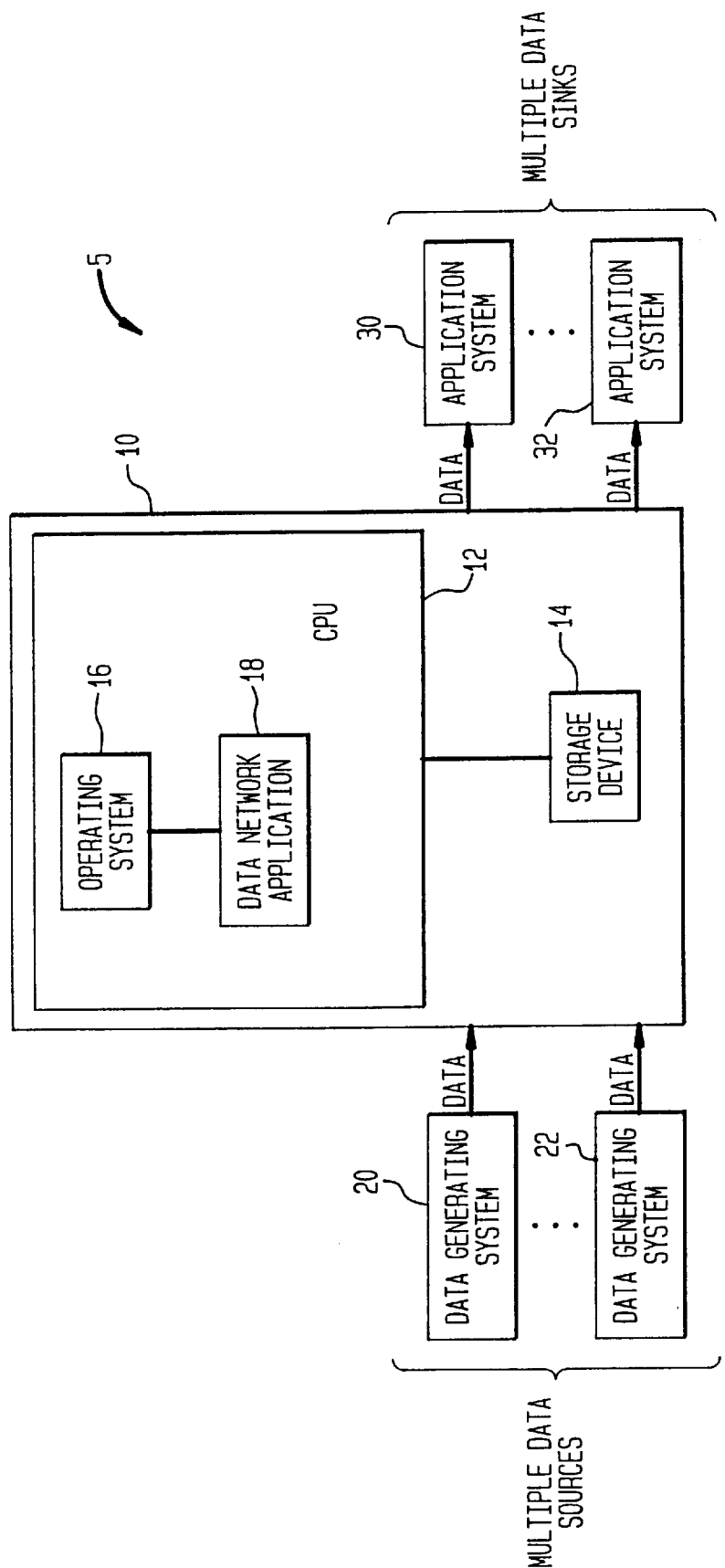
FIG. 1 is a block diagram of a system in accordance with an embodiment of the preferred implementation.

FIG. 1 illustrates a system 5 in which the present invention may be implemented. The system 5 includes a workstation 10. Workstation 10 is a computer workstation, for example, a Sparcstation (from Sun Microsystems Inc.) or a RISC SYSTEM/6000 (from International Business Machines Corp.). Workstation 10 includes a central processing unit (CPU) 12 and a storage device 14. CPU 12 includes an operating system 16 and a data network application 18.

Operating system 16 is a standard operating system like UNIX (from AT&T Corp.) or AIX (from International Business Machines Corp.), which provides the necessary operating environment for executing applications like data network application 18.

Data network application 18 implements the data networking function of this invention. Preferably, data network application 18 consists of a computer program architected using an object-oriented methodology and implemented in an object-oriented programming language such as C++ or SmallTalk. Those skilled in the art understand that object-oriented systems manipulate "objects." An object is a procedure, function, or process executed by the workstation 10, or data, which gets manipulated by the procedure, function, or process.

Storage device 14 provides storage for data network application 18 and operating system 16 and for data associated with the operation of data network application 18 and operating system 16.

Connected to workstation 10 are multiple data sources, i.e., data generating systems 20 and 22, and multiple data sinks, i.e., application systems 30 and 32. While FIG. 1 shows two data generating systems 20 and 22 and two application systems 30 and 32 connected to workstation 10, the present invention contemplates one or more sources and one or more sinks.

In general, the data generating systems 20 and 22 generate data that is provided to workstation 10 for processing by data network application 18. Data generating systems 20 and 22, which generate data for the data network application 18, may be telephone switches in a telephony network.

Data network application 18 provides processed data (originating from data generating systems 20 and 22) to application systems 30 and 32 located at a destination site, which may be different from the location of the data generating systems 20 and 22 and/or the data network application 18. Application systems 30 and 32 represent application programs executing on other workstations or computers (not shown), which are connected to workstation 10. These application programs process data from data network application 18, and generate, for example, bills to customers of the telephony network.

B. The Data Network Application—Data Flow

Figure 2:
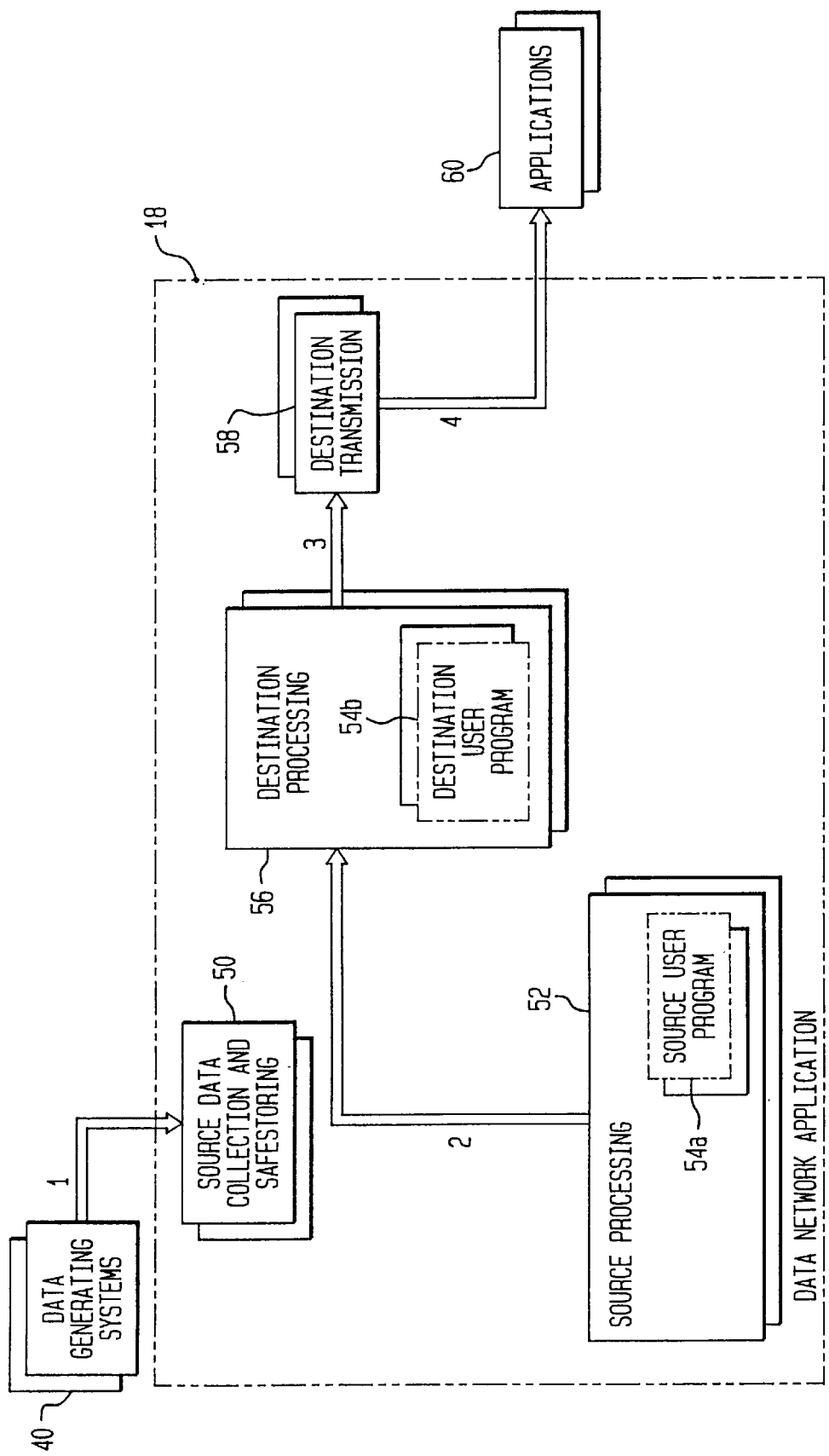
FIG. 2 is a block diagram illustrating data flow among the software components in accordance with an embodiment of the preferred implementation.

FIG. 2 is a block diagram illustrating the data flow among the various process components of the data network application 18. The data network application 18 is comprised of the following process components: source data collection and safestoring component 50, source processing component 52, user program processing component 54 (including source user program 54a and destination user program 54b), destination processing component 56, and destination transmission component 58. Each of these components is made up of one or more objects.

FIG. 2 shows that there may be more than one of each of the components 50–58. The number of sets of source components (i.e., source data collection and safestoring component and source processing component) is determined by whether existing sets can handle data from a new data generating system that begins to provide data to the data network application 18. Where one of the existing sets of source components cannot handle data from a new data generating system, an existing set of source components would have to be modified to handle the data from the new data generating system. Alternatively, a new source data collection and safestoring component, a new source processing component, and a new user program processing component (i.e., source user program) would be added to the data network application 18.

There may also be more than one set of destination components (i.e., destination processing component and destination transmission component). The number of sets of destination components is determined by whether existing sets can handle data for a new application that begins to use data from the data network application 18. Where one of the existing sets of destination components cannot handle data for a new application, an existing set of destination components would have to be modified to handle the data for the new application. Alternatively, a new destination processing component, a new destination transmission component, and a new user program processing component (i.e., destination user program) would be added to the data network application 18.

While there may be more than one of each of the components 50–58, only one of each of the components will be described below.

Source data collection and safestoring component 50 gathers data from data generating systems 40, creates objects for the collected data, and safestores those objects.

The source processing component 52 has a number of functions. First, the component 52 creates its own objects for processing the collected data placed in objects by the source data collection and safestoring component 50. Second, it executes procedures on those created objects, such an decompression and decryption processes, to enable other components of the data network application 18 to further process the collected data. Third, the component 52 provides the decompressed and decrypted data to the user program processing component 54 (i.e., source user program 54a). Fourth, the component 52 receives the output from the source user program 54a, after that source user program 54a has manipulated the data. Fifth, the source processing component 52 provides the manipulated data to the destination processing component 56.

As stated, the user program processing component 54 has two sides: source user program 54a and destination user program 54b. The source user program 54a of the user program processing component 54 reads objects with input data from the source processing component 52, and manipulates the data using predetermined instructions, which, in the preferred implementation, is to identify the destination that will be receiving the data. So the source user program 54a, using information on the type of data generating system 40 that generated the data being processed, which information is determined by examining the data, identifies the destination of that data (i.e., one of the applications 60). As suggested above, the source user programs 54a also provide the manipulated data to the source processing component 52. The destination user program 54b of the user program processing component 54 will be described below, after the description of the destination processing component 56.

The destination processing component 56 has a number of functions. First, the component 56 creates objects specific to the processing of a destination (e.g., one of applications 60). Second, it provides those objects to the user program processing component 54 (i.e., destination user program 54b). Third, it receives the objects back from the user program processing component 54 after that component has processed the data. Fifth, the component 56 provides (1) objects, including the decompressed, decrypted, and manipulated data, from the source processing component 52 and/or (2) objects, including processed data, from the user program processing component 54 to the destination transmission component 58.

Returning to the user program processing component 54, the destination user program 54b reads objects with input data from the destination processing component 56, manipulates the data using predetermined instructions, which are determined by the type of application (e.g., one of applications 60) that will be receiving the data.

The two sides to the user program processing component 54 increase the overall flexibility of the data network application 18 in two ways. First, when new data generating systems provide data, only the source components (i.e., source data collection and safestoring component 50 and source processing component 52) and source user program 54a have to be updated (or additional ones need to be added). The updated (or new) source components and source user program would be used to process data for the new data generating systems. But the destination components (i.e., destination processing component 56 and destination transmission component 58) and destination user program 54b need not be changed.

Second, when new applications are developed to use the data from the data network application 18, only the destination components and destination user program 54b need to be updated (or additional ones need to be added). The source components and source user program can continue to function unchanged.

Finally, the destination transmission component 58 has two phases of operation. In the first phase, the component 58 prepares the data contained in objects for transmission to a destination (e.g., one of applications 60) in accordance with special needs of a destination. In the second phase, the destination transmission component 58 transmits the data from its objects to a destination (e.g., one of applications 60).

As explained in detail below, objects are communicated among the components 50–58 in the form of message objects containing data. In one operation of the data network application 18, source data collection and safestoring component 50 receives data that it transforms into an object (message 1) from the data generating systems.

The destination processing component 56 receives an object (message 2) from the source processing component 52 for processing by the destination user program 54b. The destination transmission component 58 then receives an object (message 3) from the destination processing component 56. Destination transmission component 58 then creates an object (message 4) that is transformed to data to be transmitted to one of applications 60.

Details on this flow and on the object-oriented architecture of the data network application 18 will now be explained.

C. The Data Network Application Architecture

Components 50–58 of data network application 18 consist of a computer program architected using an object-oriented methodology and implemented in the C++ object-oriented programming language. Thus, this description includes a pseudo C++ notation.

(1) Definitions

The following description of the object-oriented architecture of the data network application 18 uses the Object Modeling Technique (OMT) described in J. Rumbaugh et al., "Object-Oriented Modeling and Design," Prentice Hall, Inc., 1991. The following definitions from OMT relate to the present invention.

Class—A class defines a set of common objects, which represent the items or instances manipulated by the data network application 18. Each class has a unique name. To help identify classes in the following description, all class names begin with "xoo." For example, "xooPerson" would be a class name for Person objects. Classes may include a set of attributes and a set of operations. Throughout this description class names may at times be used to specify objects of that class.

Attribute—An attribute is a data value held by objects in a class. In the class xooperson, each object would have a name attribute that may be used to identify and to differentiate between the objects in the xooPerson class (for example, Bob, Carol, Ted, or Alice). Some classes may not have any attributes.

Operation—An operation is a function or transformation that may be applied to or by objects in a class. Thus, objects from one class may invoke or initiate operations on objects in another class. Also, objects of a class may invoke operations on themselves or other-objects of that same class. But the operations being invoked belong to the class upon which the operations are being invoked. To identify operations in the following description, parentheses follow the names of operations, for example, "open( )."

Each operation has a target object as an implicit argument, and since each object "knows" its class, the target object of an operation knows the right implementation of the operation. In other words, different classes may have operations that have the same name, but the behavior of each operation will depend on the class of its target object. For example, the class xooDoor, which contains all doors in a building, and xoowindow, which contains all windows in a building, may both have operations named "open( )." But the implementation of the operation open( ) on an object in the xoodoor class may be different from the implementation of the operation open( ) on an object in the xoowindow class. Also, a class may have operations that are invoked or operated on objects of that class. In the following description these "self-operations" are illustrated as follows: "<operation name>( )_", where <operation name> is the name of an operation.

In addition to the target object, invoking an operation may require additional arguments (or variables that identify values including other classes, objects, integers, characters, strings, etc.). Any additional arguments required for an operation will be specified within the parentheses following the operation name, for example, "open(door1)", which specifies an instance of xooDoor object to be opened.

Instantiation—Instantiation is an operation used to create a unique object of a class. In the C++ programming language, a special constructor operation is used to create new instances of a class and the name of the method for a class constructor has the same name as the class, e.g., "xooPerson( )." Thus, "xooPerson( )" would be used to create an object of the xooPerson class. At times in this description the instantiation operation for a class is specifically described, and so is the step of instantiating (or creating an instance of) a class. However, all classes may be instantiated, and an instance (read object) of a class must be created before that instance can, for example, invoke operations to create instances of other classes and to perform other processes on previously created objects.

Method—A method is the implementation of an operation for a class on an object of that class. For example, the class xooFile, which defines a set of file objects, may have an operation "print( )." There may be several methods used to implement the print( ) operation depending upon the type of file (ASCII, binary, digitized picture, etc.) to be printed. In other words, xooFile would have a file type attribute used to define a file type for each object in the class and, depending upon the value of the file type attribute for an object, an appropriate print( ) method would be implemented. The method depends only on the target object.

Event—An event is something that happens at a point in time. An event conveys information from one object of a class to another object of the same or a different class.

Figure 3:
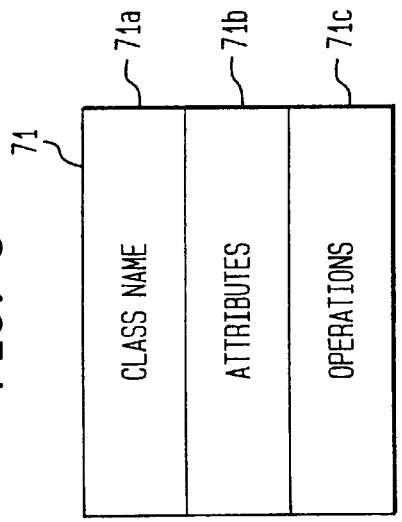
FIG. 3 is a block diagram of a notation used to describe the object-oriented architecture of the preferred implementation.

The OMT method of illustrating classes and associated attributes and operations is shown in FIG. 3. The class 71 has a class name field 71a, followed by an attributes field 71b, followed by an operations field 71c. The class name field 71a includes the name of a class, the attributes field 71b includes a set of the attributes of the class, and the operations field 71c includes a set of the operations of the class. This method is used in FIGS. 4–10 to illustrate the classes implemented in the data networking system 18. The names of attributes listed for the classes are names assigned to the values of attributes for objects of a class. Note that in those cases where the set of attributes or operations for a class is empty, the appropriate attribute and/or operations field is blank. This does not mean that there are no attributes and/or operations for those classes, but simply that this description of the preferred implementation does not require details on those attributes and/or operations.

To understand the concept of classes, it is important to understand the concept of generalization in OMT. Generalization is the relationship between a class and one or more refined versions of it. The class being refined is called a "superclass" and each refined version is called a "subclass." Attributes and operations common to a group of subclasses are attached to the superclass and shared by each subclass. Thus, each subclass is said to inherit the features (i.e., attributes and operations) of its superclass. The notation in OMT for generalization is a triangle connecting the superclass to its subclasses. For example, a superclass named xooEquipment may have attributes including the name, manufacturer, weight, and cost of equipment.

```
xooEquipment
name
manufacturer
weight
cost
```

Refined versions of the xooEquipment superclass might include the subclasses xooPump and xooTank.

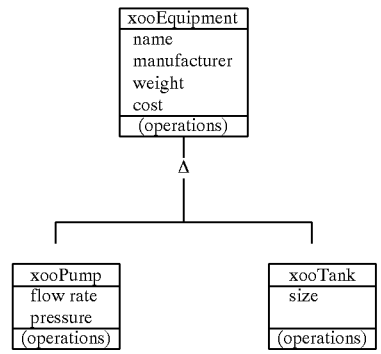

Each of the subclasses xooPump and xooTank might have different attributes and operations, but both subclasses would also have (or inherit) the attributes of their superclass xooEquipment. So while the subclass xooPump might have attributes like flow rate and pressure, xooPump would also have (or inherit) the attributes of its superclass xooEquipment, i.e., name, manufacturer, weight, and cost. And xooTank might have a size attribute, but it would also have the attributes of its superclass xooEquipment.

Another OMT concept is the "link" relationship between objects of classes. One link relationship is the "is a"

relationship, which is used to describe the relationship between an object of a subclass and an object of the subclass' superclass. The object of the subclass "is a" object of its superclass because it inherits all features of its superclass. Another link relationship is the "has a" relationship, which is used to describe a relationship between objects of different classes where one of the objects uses the other object during execution.

(2) Classes, Attributes, Operations of Data Network Application

Figure 4:
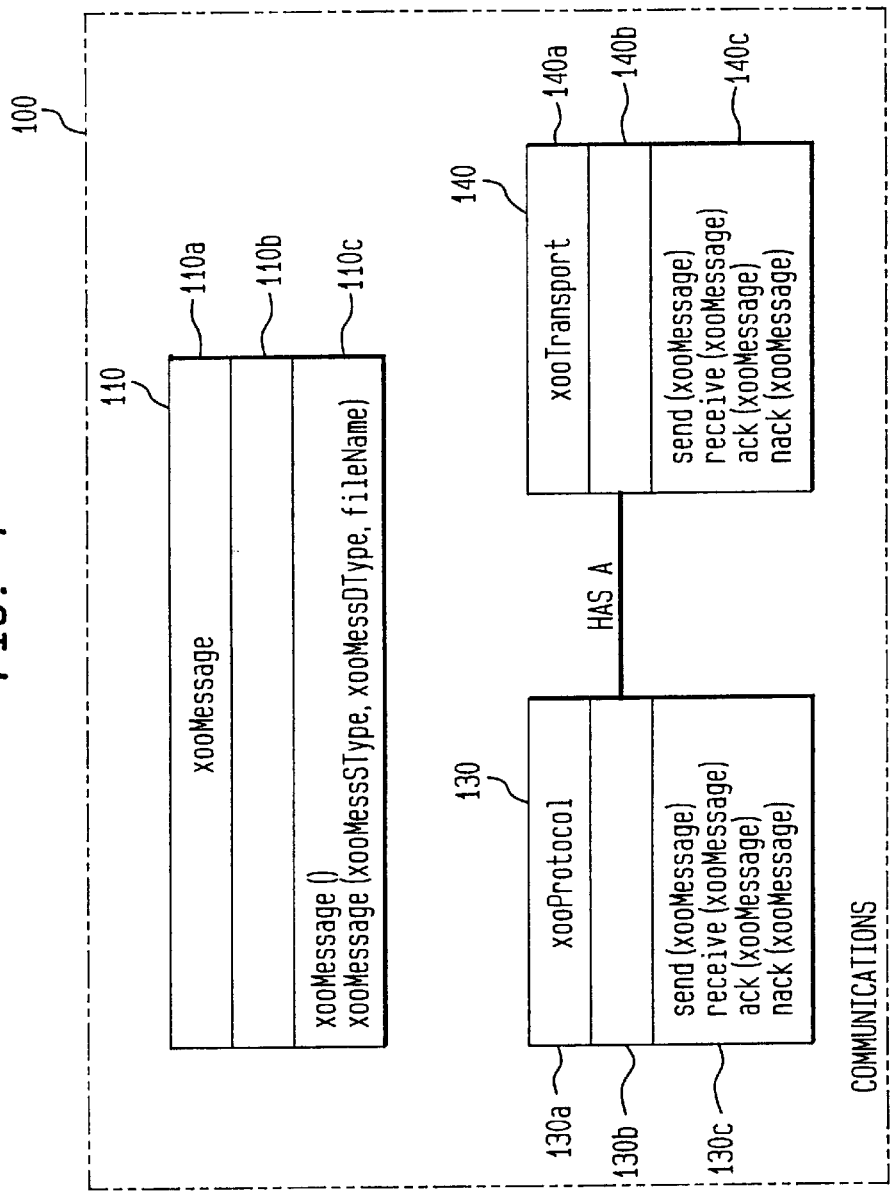
FIGS. 4–10 are class diagrams of the object-oriented architecture in accordance with an embodiment of the preferred implementation, specifically.

FIG. 4 illustrates the communications classes 100, which define objects used for communications throughout the data network application 18. There are three communications classes 110, 130, 140 shown in FIG. 4. The first communications class is named "xooMessage", as specified in the class name field 110a, the second communications class is named "xooprotocol", as specified in the class name filed 130a, and the third is named "xooTransport" as specified in the class name field 140a. As illustrated in FIG. 4, the xooProtocol class 130 is related to the xooTransport class 140 by a "has a" relationship. As explained above, this relationship means that objects of the xooProtocol class 130 use objects of the xooTransport class 140. How the objects of the xooProtocol class 130 use objects of the xooTransport class 140 will explained below with reference to FIG. 12.

The xooMessage class 110 defines objects that represent messages sent and received in the data network application 18. One operation for the xooMessage class 110 is shown in the operations field 110c, "xooMessage( )". As explained, this operation is used to instantiate or create an instance (or object) of the xooMessageClass. (Objects of a class may at times be referred to by simply using the name of its class.) Although all of the constructor operations (i.e., operations that create instances of a class) are not illustrated in FIGS. 4–10, all classes include such constructor operations. Another operation is xooMessage(xooMessSType, xooMessDType,fileName). This operation is used to create a temporary xooMessage object using the fileName. xooMessSType,xooMessDType are integers, with the first identifying a data generating system and the second indicating that the data from that data generating system is in a file.

The xooProtocol class 130 defines objects that represent the protocol of the data network application 18, and are used to send and receive objects of the xooMessage class 110 in the data network application 18. Several operations are specified in the operations field 130c, namely "send( )", "receive( )", "ack( )", and "nack( )". An object of the xooMessage class 110 is the only agrument for each of the operations listed above, of the xooProtocol class 130. This is illustrated by listing xooMessage in the parentheses for each of the operations for the xooProtocol class 130, for example, "send(xooMessage)".

The "send( )" operation of the xooProtocol class 130 is used to send an object of the xooMessage class 110 (i.e., a xooMessage object) within the data network application 18. The "receive( )" operation of the xooProtocol class 130 is used to receive a xooMessage object. The "ack( )" operation of the xooProtocol class 130 is used to acknowledge receipt of a xooMessage object, while the "nack( )" operation of the xooProtocol class 130 is used as a negative acknowledgement of a xooMessage object.

The xooTransport class 140 is a class to define objects that represent the transport medium (e.g., tcp/ip) of the data network application 18. Several xooTransport class 140 operations are specified in the operations field 140c, namely "send( )", "receive( )", "ack( )", and "nack( )". An object of the xooMessage class 110 is the only agrument for each of the operations listed above, of the xooTransport class 140. This is illustrated by listing xooMessage in the parentheses for each of the operations for the xooTransport class 140, for example, "send(xooMessage".

The "send( )" operation of the xooTransport class 140 is used to convert an object of the xooMessage class 110 into data and send the data within the data network application 18 over a transport medium. The "receive( )" operation of the xooTransport class 140 is used to receive data from a transport medium and convert it to a xooMessage 110 object. The "ack( )" operation of the xooTransport class 140 is used to acknowledge receipt of a xooMessage object, while the "nack( )" operation of the xooTransport class 140 is used as a negative acknowledgement of a xooMessage object.

Figure 5:
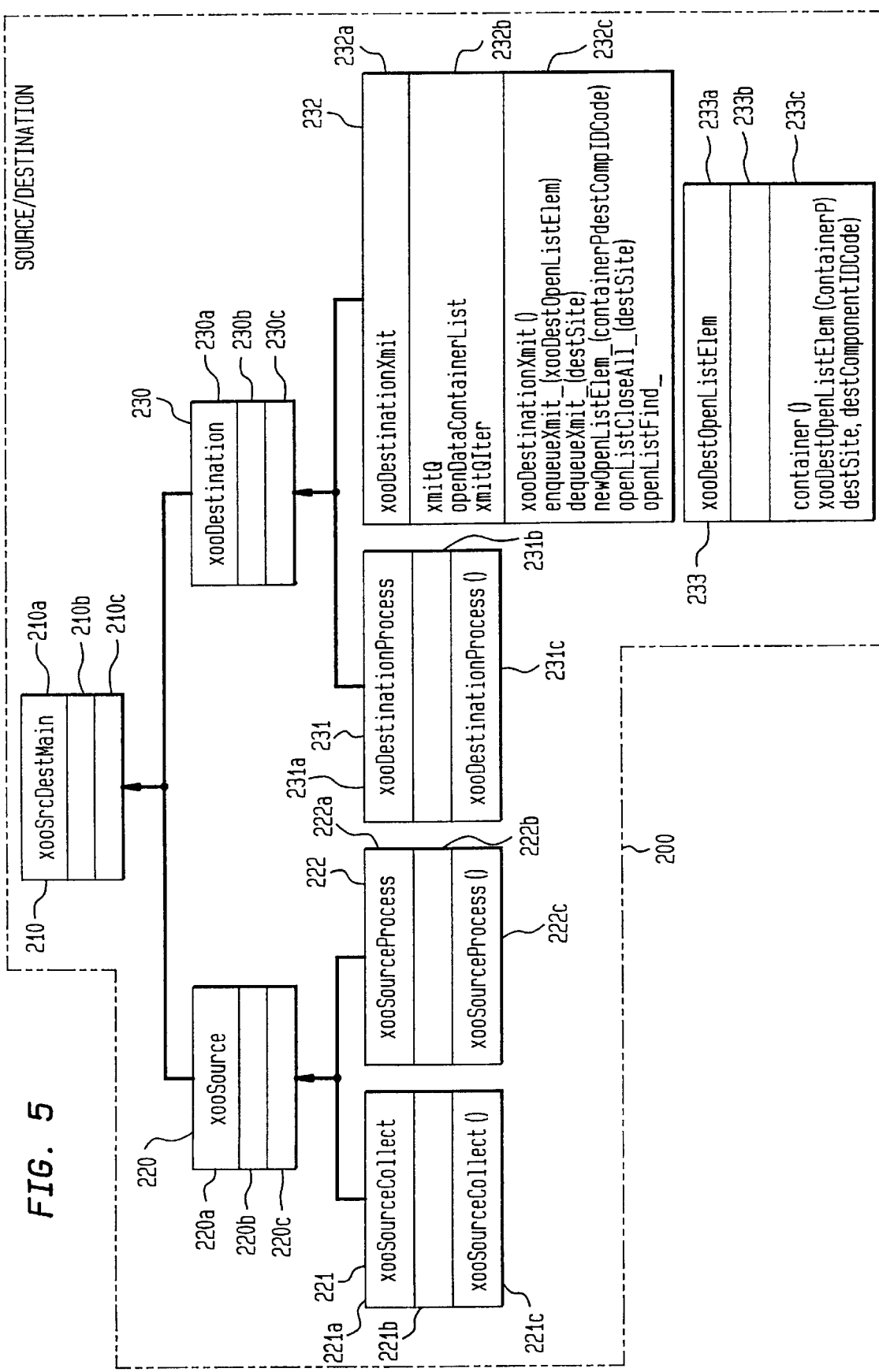

FIG. 5 illustrates the source and destination classes 200, which define objects used to identify sources of data (e.g., data generating systems 20 and 22 of FIG. 1) and destinations for data (e.g., application systems 30 and 32 of FIG. 1) being processed by the system 5. The name in the class name field 210a for the class 210 is "xooSrcDestMain" 210a, which is shorthand notation for source destination main. The xooSrcDestMain class 210 may also have attributes (field 210b) and operations (field 210c).

The xooSrcDestMain class 210 is a superclass for both source and destination objects with two subclasses: the class 220 with a class name in the class name field 220a of "xooSource" and the class 230 with a class name in the class name field 230a "xooDestination." The xooSource subclass 220 is an abstraction for every data source (e.g., data generating systems 20 and 22 of FIG. 1) that will be providing data for processing by the data network application 18. The xooDestination subclass 230 is an abstraction for every data destination (e.g., application systems 30 and 32 of FIG. 1) that will receive data processed by the data network application 18. The xooSource subclass 220 and the xooDestination subclass 230 may also have attributes (fields 220b and 230b, respectively) and operations (fields 220c and 230c, respectively).

Both the xooSource subclass 220 and the xooDestination subclass 230 are superclasses to other subclasses. The xooSource subclass 220 is a superclass for objects within two subclasses: the class 221 with a class name in the class name field 221a of "xooSourceCollect" and the class 222 with a class name in the class name field 222a "xooSourceProcess." Objects of the xooSourceCollect subclass 221 are used for data collection (see FIGS. 12 and 13) from data sources (e.g., data generating systems 20 and 22 of FIG. 1). Objects of the xooSourceProcess subclass 222 are used for data processing of data collected from data sources (see FIGS. 14 and 15). The subclasses 221 and 222 may also have attributes (fields 221b and 222b, respectively) and operations (fields 221c and 222c, respectively). The operations shown for classes 221 and 222 are ones that instantiate those classes, namely, xooSourceCollect( ) and xooSourceProcess( ).

Finally, xooDestination subclass 230 is a superclass for objects within two subclasses: the class 231 with a class name in the class name field 231a of "xooDestinationProcess" and the class 232 with a class name in the class name field 232a "xooDestinationXmit." ("Xmit" is shorthand for the word "transmit.") The xooDestinationProcess subclass 231 is used for processing data (see FIGS. 18 and 19) specific to destinations (e.g., application systems 30 and 32 of FIG. 1). The xooDestinationXmit subclass 232 is used for transmitting destination data to a destination (see FIGS. 20–23). The subclasses 231 and 232 have attributes (fields 231b and 232b, respectively) and/or operations (fields 231c and 232c, respectively). The operation for class 231 (i.e., xooDestinationProcess( )) is one that instantiates that class.

The attributes for class 232 are xmitQ and openDataContainerList. The xmitQ attribute defines a list of recently closed data containers (i.e., objects of the xooDestOpenListElem class 233) that are queued for transmission. The openDataContainerList attribute of the xooDestXmit class 232 defines a list of open data container objects, namely, objects of the xooDestOpenListElem class 233. Another attribute is xmitQIter, which is an iterator used to extract xooDestOpenListElem objects from xmitQ. This iterator starts at a current position (to start at the top it has to be reset) in xmitQ and returns a xooDestOpenListElem object.

The operations for class 232 include an operation for instantiating the class 232 (i.e., xooDestinationXmit( )). Other operations include:

enqueueXmit__(xooDestOpenListElem), dequeueXmit__ (destSite), newOpenListElem__(containerP, compIDCode), and openListCloseAll__(destSite).

enqueueXmit__(xooDestOpenListElem) is used to queue objects of the xooDestOpenListElem class 233 for later dequeuing and transmission. dequeueXmit__(destSite) is used to dequeue objects of the xooDestOpenListElem class 233 for transmission to a destination specified by destSite.

newOpenListElem__(containerP,destCompIDCode) is used to create a new object of xooDestOpenListElem class 233 using a xooDataContainer object and the destCompID-Code (described below), and openListCloseAll__ (destSite) is used to close all the open data containers at a given destSite (described below) and queues them on the xmitQ. This makes the list of data containers ready for transmission.

Another operation in class 232 is openListFind__ (searchName). This operation takes a data container (xooDataContainer object) from a xooDataContainerList object, and tries to match the data container with an already existing open data container, i.e., xooDestOpenListElem object. Matching here means comparing the logical names of the data container and the open data container. The argument searchName is the logical name of the data container from the xooDataContainerList object.

Another of the source and destination classes 200 is xooDestOpenListElem class 233. The xooDestOpenListElem class 233 defines open data container objects (see xooDataContainer in FIG. 6) that will receive processed data, as explained below. The xooDestOpenListElem class 233 has two operations. The first operation is container( ). This operation is used to return an open data container object in the xooDestOpenListElem class 233. An example of this operation is explained below.

The second operation is xooDestOpenListElem (containerP,destSite,destComponentIdCode). This operation creates an instance of the xooDestOpenListElem class 233. The argument containerP is used to identify an open data container object (see xooDataContainer in FIG. 6), and destSite and destComponentIdCode are used to identify the application system 30 or application system 32. While destSite is a readable string, destComponentIdCode is a sequence number for a particular destination.

Figure 6:
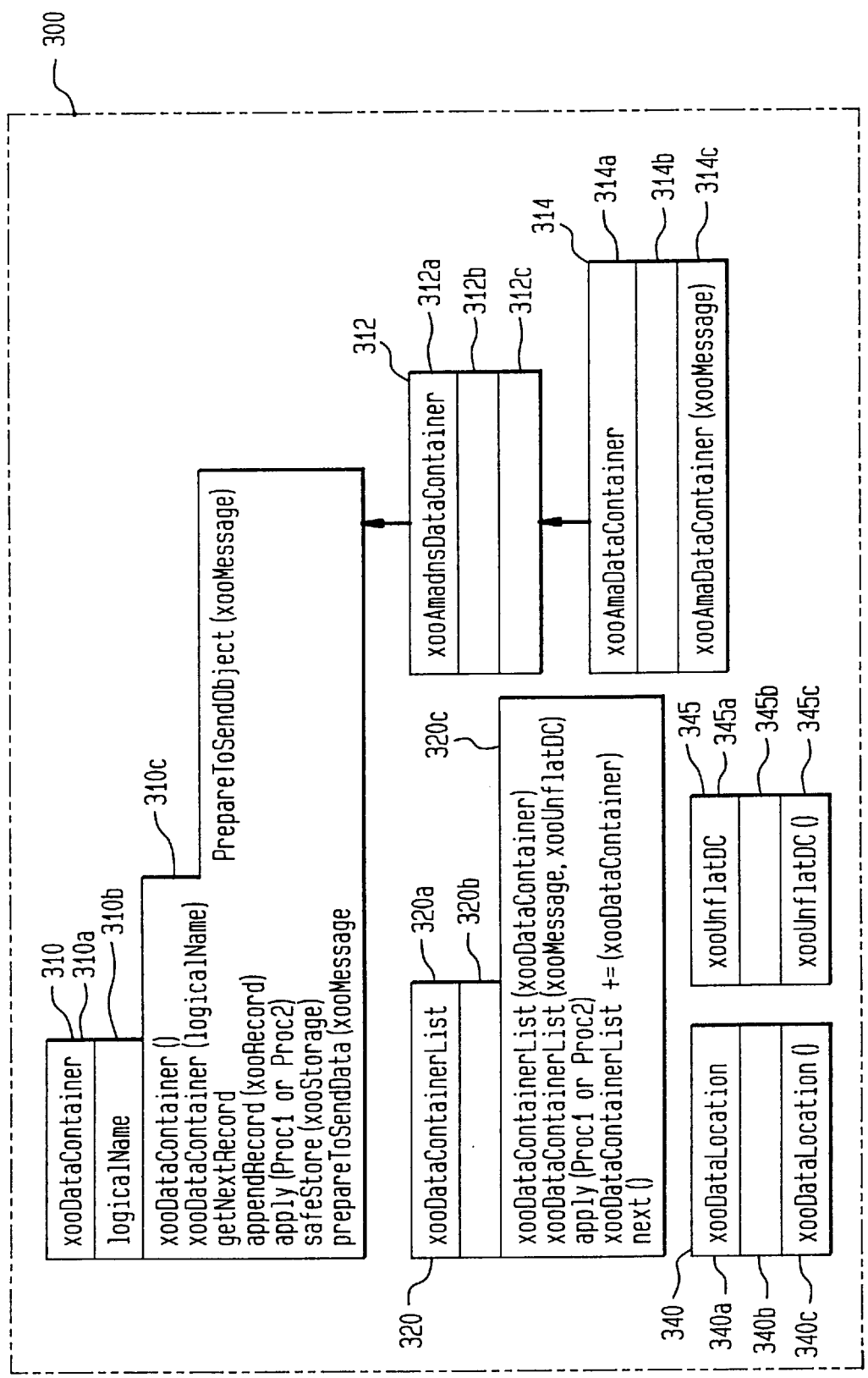

FIG. 6 illustrates the data container and data location classes 300, which define objects used for manipulating data processed by the system 5. The first class 310 illustrated in FIG. 6 has a class name "xooDataContainer" in the class name field 310a. The xooDataContainer class 310 defines objects used to hold objects of the xooRecord class 350, which will be described below. Objects of the xooDataContainer class 310 attribute are shown in attribute field 310b and several operations are shown in operations field 310c.

The attribute shown for the xooDataContainer class 310 identified in attribute field 310b is "logicalName." This attribute is for the name of the logical destination that will receive the processed data.

There are six operations shown in the xooDataContainer class 310 identified in operations field 310c. The first operation is "xooDataContainer( )." As discussed above with respect to the xooMessage class 110, the xooDataContainer( ) operation is used to instantiate the xooDataContainer class 310. In other words, this operation is used to create an object of the xooDataContainer class 310. Another operation of the xooDataContainer class 310 is "xooDataContainer(logicalName)." This is the same operation as xooDataContainer( ), but it includes an argument, namely, "logicalName." The value corresponding to this argument will be used as the name of the xooDataContainer object created when the xooDataContainer(logicalName) operation is performed.

Note that both the first and second operations have the same name, i.e., xooDataContainer( ), but one has an argument and the other does not. This is permitted because the appropriate method corresponding to the operation name is selected based on the existence (or nonexistence) of arguments for the operation when it is invoked. In other words, a different method is invoked in response to the first operation without the argument. The same is true for all cases where the operation name is repeated. When the operation is invoked, the appropriate method corresponding to that operation is determined and then executed.

Another operation of the xooDataContainer class 310 is "getNextRecord( )." This operation is used to retrieve the next xooRecord object (discussed below) from within an object of the xooDataContainer class 310. The xooDataContainer class 310 also includes an "appendRecord( )" operation that requires as an argument the value of an object of the xooRecord class. This operation will append to a xooDataContainer object a xooRecord object, which was identified as an argument when the operation is executed.

Another operation of the xooDataContainer class 310 specified in the operations field 310c is "apply( )." This operation requires as an argument of one of two values, Proc1 or Proc2, both of which identify a specific function to be applied to all data (i.e., xooRecords) contained within a xooDataContainer object. Details on the functions performed by the Proc1 and Proc2 functions will be described below.

The xooDataContainer class 310 also includes a "safestore( )" operation in the operations field 310c. This operation requires as an argument the value of an object of the xoostorage class 410 (discussed below). Invoking this operation causes an object of the xooDataContainer class 310 to be safestored in the object of the xoostorage class identified in the argument to the operation.

The xooDataContainer class 310 includes a "prepareToSendData( )" operation in the operations field 310c. This operation requires an argument of the xooMessage class 110 (discussed above). This operation is invoked to transform a xooDataContainer object into data in a xooMessage object specified as the argument to the operation.

Finally, the xooDataContainer class 310 includes a "prepareToSendObject( )" operation in the operations field 310c. This operation requires as an argument the value of an object of the xooMessage class 110 (discussed above). This operation is invoked to transform a xooDataContainer object into the xooMessage object specified as the argument to the operation.

The xooDataContainer class 310 has one subclass, xooAmadnsDataContainer 312, which also has a subclass, xooAmaDataContainer 314. xooAmadnsDataContainer class 312 defines objects for containing automatic message accounting data network system data, and the xooAmaDataContainer class 314 defines objects for containing "Ama" data, i.e., automatic message accounting data. The xooAmaDataContainer 314 has one operation shown in FIG. 6, namely, xooAmaDataContainer(xooMessage). This operation is used to create an object of class 314 with a xooMessage object.

The next class 320 illustrated in FIG. 6 has a class name "xooDataContainerList" in the class name field 320a. The xooDataContainerList class 320 defines objects used to contain a list of objects of the xooDataContainer class 310. For objects of the xooDataContainerList class 320 several operations are shown in operations field 320c.

One of the operations of the xooDataContainerList class 320 identified in operations field 320c is "xooDataContainerList( )." The xooDataContainerList( ) operation is used to instantiate the xooDataContainerList class 320. In other words, this operation is used to create an object of the xooDataContainerList class 320. This operation requires an argument, namely, "xooDataContainer." The value corresponding to this argument (namely an object of the xooDataContainer class 310) will be added to the object of xooDataContainerList class 320 when that object of xooDataContainerList class 320 is created.

Another operation of the xooDataContainerList class 320 identified in operations field 320c is "apply( )." This operation requires as an argument one of two values, Proc1 or Proc2, both of which identify a specific function to be applied to all data (i.e., objects of the xooDataContainer class 310) contained within a xooDataContainerList object. Details on the functions performed by the Proc1 and Proc2 functions will be described below.

Two other operations for class 320 are xooDataContainerList(xooMessage,xooUnflatDC) and next( ). There are two methods for xooDataContainerList (xooMessage, xooUnflatDC). If the xooMessage object is flattened (discussed below), in one method the flattened xooMessage is unflattened (also discussed above) into a xooDataContainerList object. If the xooMessage object is already unflattened, then the second method will take the xooDataContainerList object and flatten in into a xooMessage object. Which method is invoked in a particular case will depend upon the state (flattened or unflattened) of the xooMessage object.

The "next( )" operation extracts that next object of a xooDataContainer class 310 from within a xooDataContainerList object.

Another operation for the xooDataContainerList class 320 is used to add an object of the xooDataContainer class 310 to an existing object of the xooDataContainerList class 320. This operation is similar to the xooDataContainerList( ) operation, which includes as an argument a xooDataContainer object to be added to a new object of the xooDataContainerList class 320 that is created. However, since the xooDataContainer object in this case is being added to an existing object of the xooDataContainerList class 320, using C++ programming language notation, this operation is illustrated as follows: "xooDataContainerList+= (xooDataContainer)."

The next class of the data container and data location classes 300 illustrated in FIG. 6 is the class 340 with a class name "xooDataLocation" in the class name field 340a. This class 340 is used to define objects that represent the file or buffer in storage (namely storage device 14 of FIG. 1) that will physically contain the data associated with objects of the xooDataContainer class 310. The operation shown in field 340c is "xooDataLocation( )", which is used to instantiate the xooDataLocation class. In other words, the xooDataLocation( ) operation is used to create an object of the xooDataLocation class 340.

The last class of the data container and data location classes 300 illustrated in FIG. 6 is the xooUnflatDC 345. This class defines objects that operate on data in a xooMessage object. As explained above, xooMessage objects contain objects of the xooDataContainerList class, which in turn includes xooDataContainer objects. When a xooMessage object is created, all xooDataContainer objects within the xooDataContainerList object get flattened, that is, the objects get converted into data. When the reverse takes place all xooDataContainer objects that have been flattened or converted in a xooMessage object get unflattened by xooUnflatDC and are inserted into a xooDataContainerList object.

Figure 7:
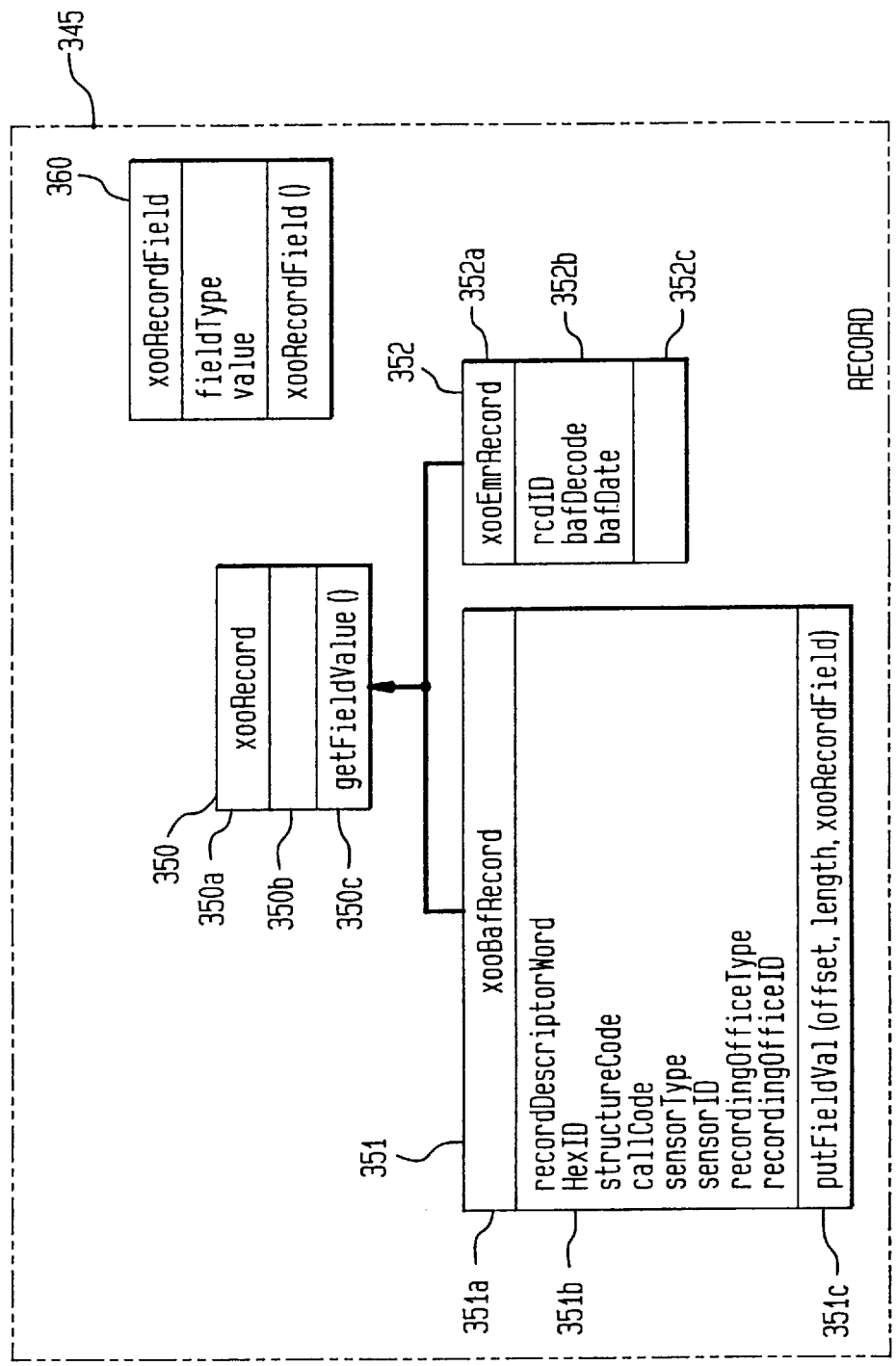

FIG. 7 illustrates the record classes 345, including a class hierarchy. As shown in FIG. 7, the xooRecord class 350 is a superclass with two subclasses: xooBafRecord 351 and xooEmrRecord 352. As explained above, subclasses inherit all of the attributes and operations of their superclasses. The prefix "Baf" is used to connote a preferred data format for applications (e.g., application system 30) used for billing telephone customers. The prefix "Emr" is used to connote another data format, which is generally used to bill customers in exchanges different from where the telephone call was made. For example, if a user makes a call from one telephone in one network (called the out-of-network telephone) and bills the call to another telephone in another network (called the in-network telephone), an "Emr" record is generated and provided to the operator of the network for the in-network telephone to bill the user for the call.

The xooRecord class encapsulates a record of data that came from data generating system 20 or 22. The data within the record has several partitions (called fields). Each partition starts at a particular position within the record (offset) and has a certain length. The xooRecord class 350 attributes are not listed in the attributes field 350b, but one operation, namely, "getFieldValue( )", is specified in the operations field 350c. This operation retrieves the value of a field within the xooRecord.

The xooBafRecord class 351 defines objects that represent data associated with, for example, telephone calls that occur in a telephony network for billing purposes. Objects of the xooBafRecord class 351 have a variety of attributes, which are listed in the attributes field 351b. The attributes are "recordDescriptorWord", "hexID", "structureCode", "callCode", "sensorType", "sensorID", "recordingofficeType", "recordingOfficeID." The first attribute "recordDescriptorWord" is used to hold a value corresponding to the size of an event record. The second attribute "hexID" is used to hold a value of an identifier for an event record, while the third attribute "structureCode" is used to hold a set of data fields that constitute a recording structure. For example, structure codes identify a type of telephone call such as collect call, calling card call, and the like. The next attribute, namely, "callCode", holds a value that defines the type of event record, and the "sensorType" attribute holds a value that defines the type of sensor (e.g., switch circuit) that originated the event record. The "sensorID" attribute provides the value of an identifier for a particular sensor, the "recordingOfficeType" attribute holds a value that defines the type of office that generated the event record. Types of offices include switching systems that comprise a telephony network. Finally, the "recordingofficeID" attribute holds a value for the identification of a particular recording office.

The one operator for the xooBafRecord class 351 is putFieldVal( ). This operation requires three arguments: offset, length, and xooRecordField. The putFieldVal( ) operation puts the value of an attribute from an object of the xooRecordField 360 class in an object of the xooBafRecord class 351 at an offset position with length. In other words, the data corresponding to a xooBafRecord object is comprised of partitions (or fields). The offset argument identifies the distance from the beginning of that string to the field where the value of an attribute from an object of the xooRecordField class will be placed in the xooBafRecord object. The length argument specifies the length in the xooBafRecord object for the value of an attribute from an object of the xooRecordField class. xooRecordField is an abstraction for any field (i.e., partition) within the data corresponding to a xooRecord.

The last class of the record class 345 illustrated in FIG. 7 is the xooRecordField class 360. This class is used to define an abstraction for the fields of a record of input data to be processed by data network application 18. The xooRecordField class 360 has two attributes and one operation. As specified in the attributes field 360b, the attributes for the xooRecordField class 360 are "fieldType" and "value." The first attribute, fieldType is used to describe a type of field in a record that is being abstracted by an object of the xooRecord Class 360 (e.g., string, character, integer, etc.). The second attribute is the used to hold the value contained in the field in that record being abstracted by an object of the xooRecord Class 360.

Figure 8:
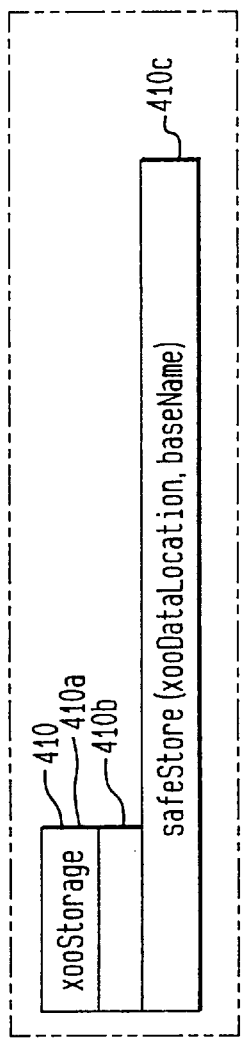

FIG. 8 illustrates the xooStorage class 410. The xooStorage class 410 is used as a base class for identifying data stored by the data network application 18 during operation. The xooStorage class 410 has no attributes listed in the attributes field 410b, but it has one operation, namely, "safeStore( )", specified in the operations field 410c.

As explained above, different classes may have operations that have the same operation name. For example, the xooDataContainer class 310 also has a "safeStore( )" operation (see field 310c). But since objects know their classes, there is no concern that having operations with the same name in different classes will cause execution problems during operation of the data network application 18. Invoking the safeStore( ) operation on an object of the xooDataContainer class 310 will cause different processing than invoking the safeStore( ) operation on an object of the xooStorage class 410, each operation being defined differently.

The safeStore( ) operation of the xooStorage class 410 safestores in storage device 14 the data identified by two arguments, an object from the xooDataLocation class 340 and a value. The value is identified in FIG. 8 by the variable name "baseName." The variable baseName represents the name of a file in a temporary partition of the storage device 14.

Figure 9:
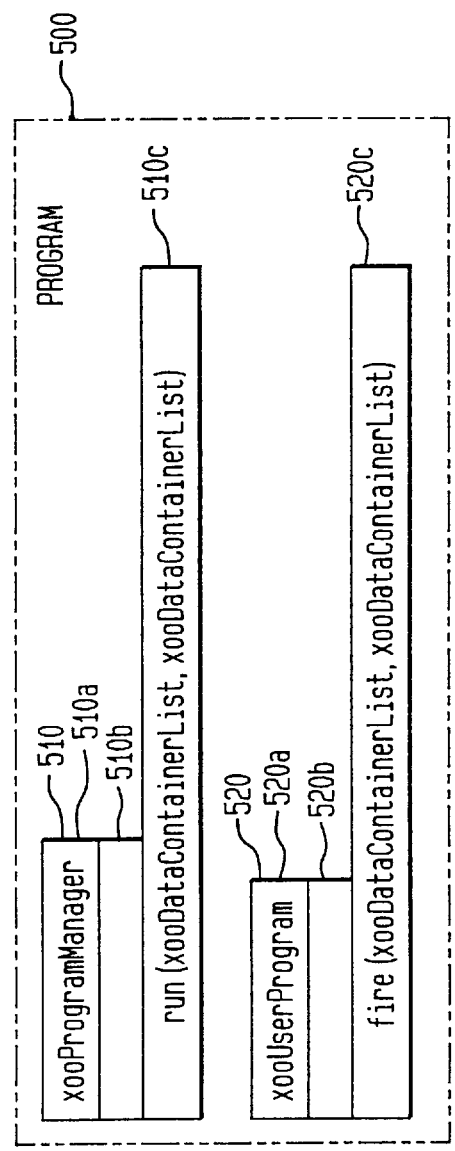

The Program Manager and User Program classes 500 are illustrated in FIG. 9. The two classes 500 are xooProgramManager class 510 and xooUserProgram class 520. The xooProgramManager class 510 defines a class of objects for managing user programs and the xooUserProgram class 520 defines a class of objects, each representing a user program. There are two categories of user programs: (1) a preprocessing operation required by an application (e.g., applications 30 and 32) destined to receive data from the data network application 18; and (2) a source processing operation or an operation requested by the source of the data (e.g., data generating systems 20 and 22).

One operation is shown for each of the classes 510 and 520 (see operation fields 510c and 520c). The operation of xooProgramManager class 510 is run( ), which is invoked to run a user program. The run( ) operation requires two arguments, both of which are objects of the xooDataContainerList class 320. The first argument of the run( ) operation represents an object of the xooDataContainerList class 320 that includes a list of objects of the xooDataContainer class 310 to be processed by the user programs (also known as an "in list"). The second argument of the run( ) operation also represents an object of the xooDataContainerList class 320 that includes a list of objects of the xooDataContainer class 310, but the second argument is for a list of objects of the xooDataContainer class 310 processed by the user programs (also known as an "out list").

The operation of xooUserProgram class 520 is fire( ), which is invoked to fire a user program. The fire( ) operation requires two arguments, both of which are objects of the xooDataContainerList class 320. The first argument of fire( ) is the same as the first argument to the run( ) operation of the xooProgramManager class (i.e, inList) and the second argument of fire( ) is the same as the second argument to the run( ) operation of the xooProgramManager's class (i.e, outList)

Figure 10:
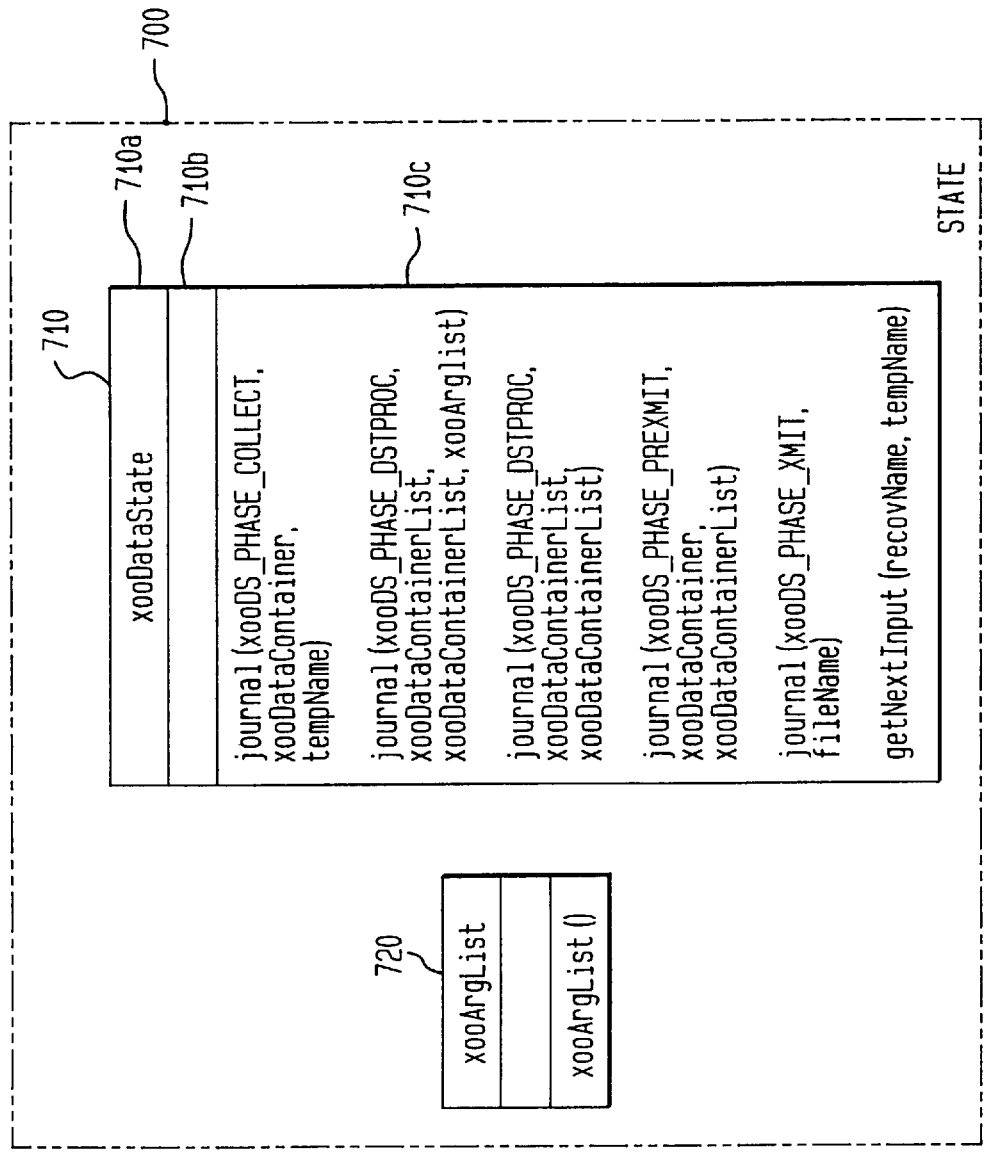

FIG. 10 illustrates the state classes 700, including the xooDataState class 710 and the xooArglist class 720. The xooDataState class 710 represents objects that define the data state of the data network application 18 during processing. The objects of this class 710 are used for recovery purposes in case of system failures. These objects record the states of processing by the data network application 18, which is used to recreate process states should the application 18 fail during execution.

The xooDataState class's 710 operation is journal( ). There are five possible journal( ) operations, differentiated by the arguments specified when the operation is invoked. They are: (1) journal source collection; (2) journal source processing; (3) journal destination processing; (4) journal destination preparation for transmission; and (5) journal destination transmission.

Figure 11:
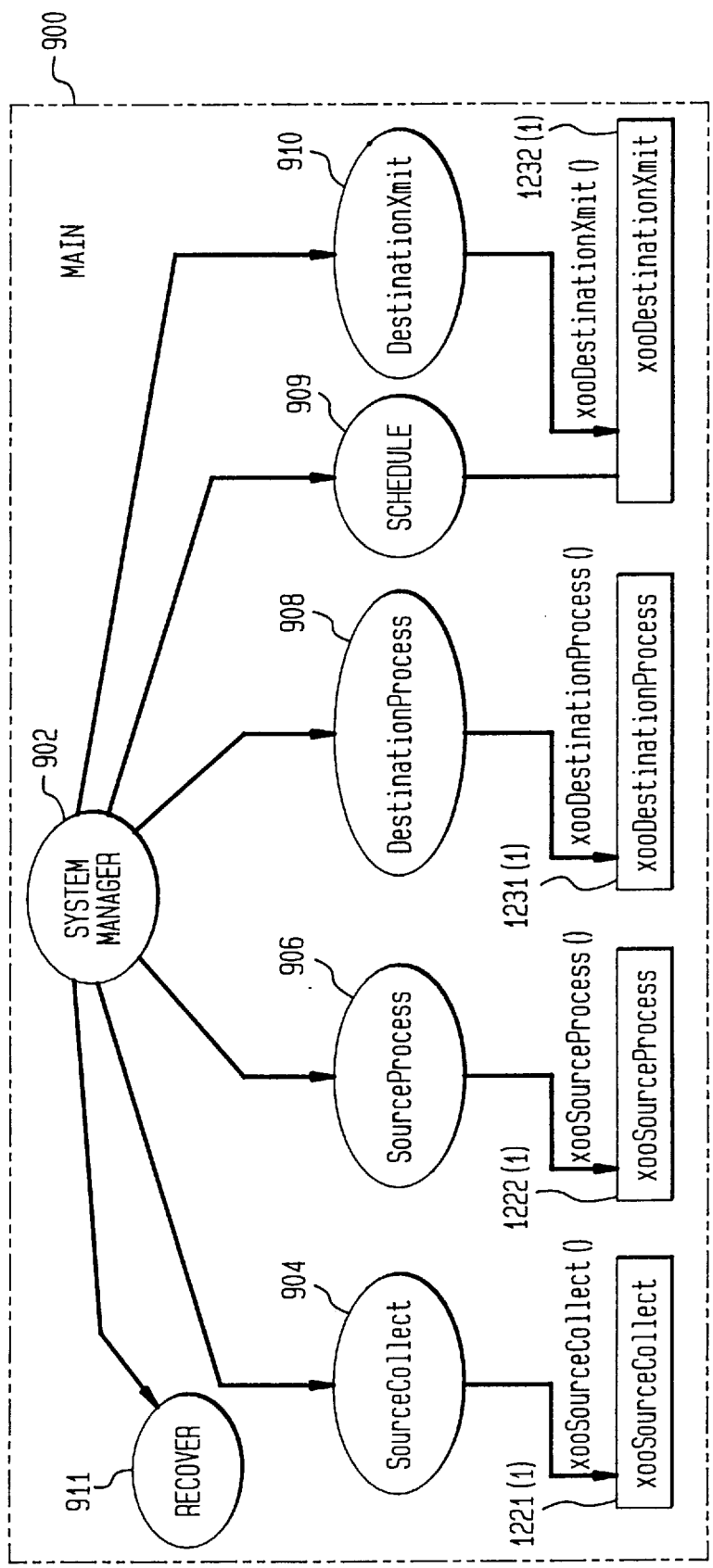
FIG. 11 is a block diagram showing a main process in accordance with an embodiment of the preferred implementation.
Figure 12:
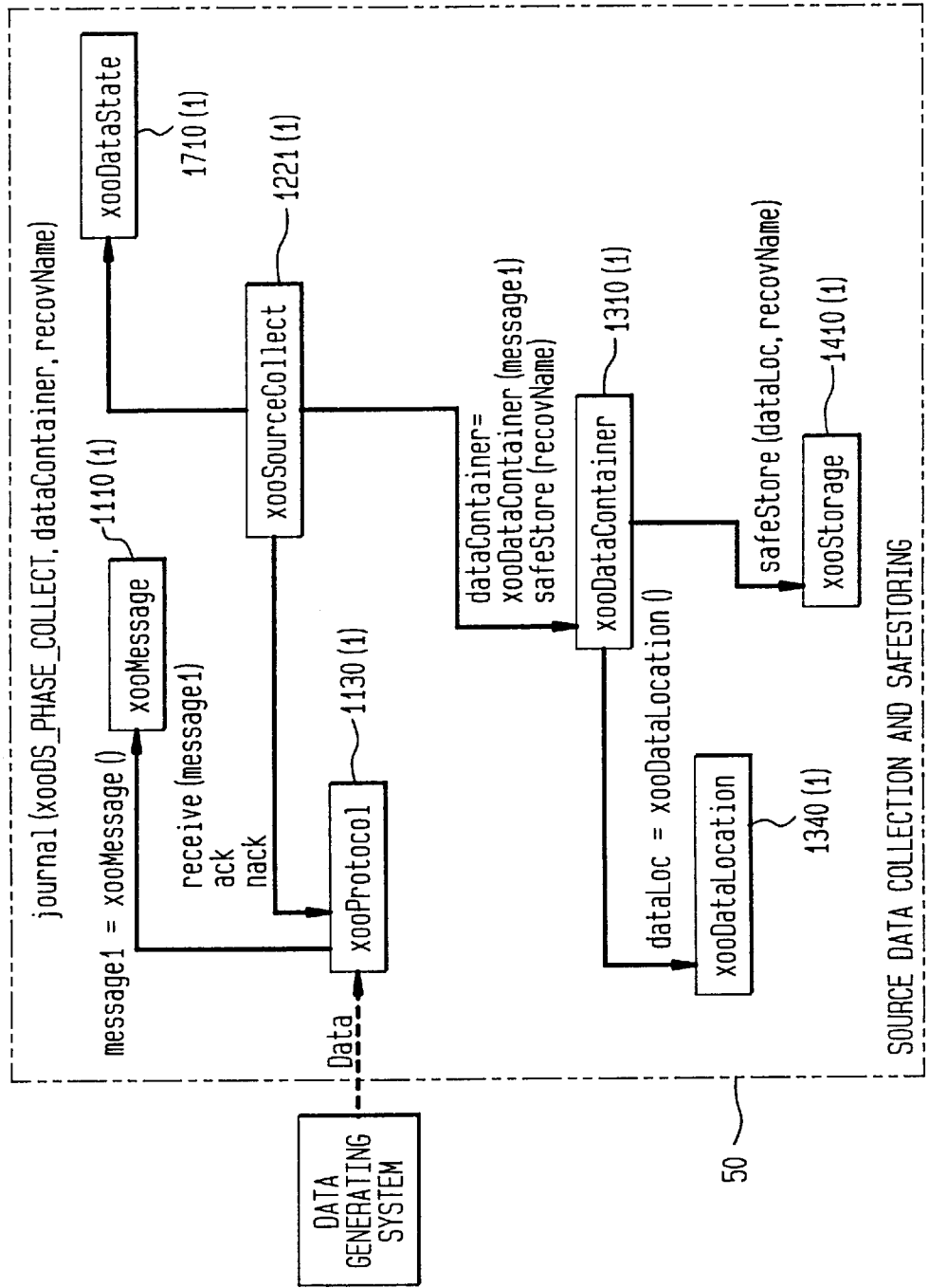
FIGS. 12 and 13 are block diagrams showing an operation of a source data collection and safestoring component in accordance with an embodiment of the preferred implementation, specifically.
Figure 13:
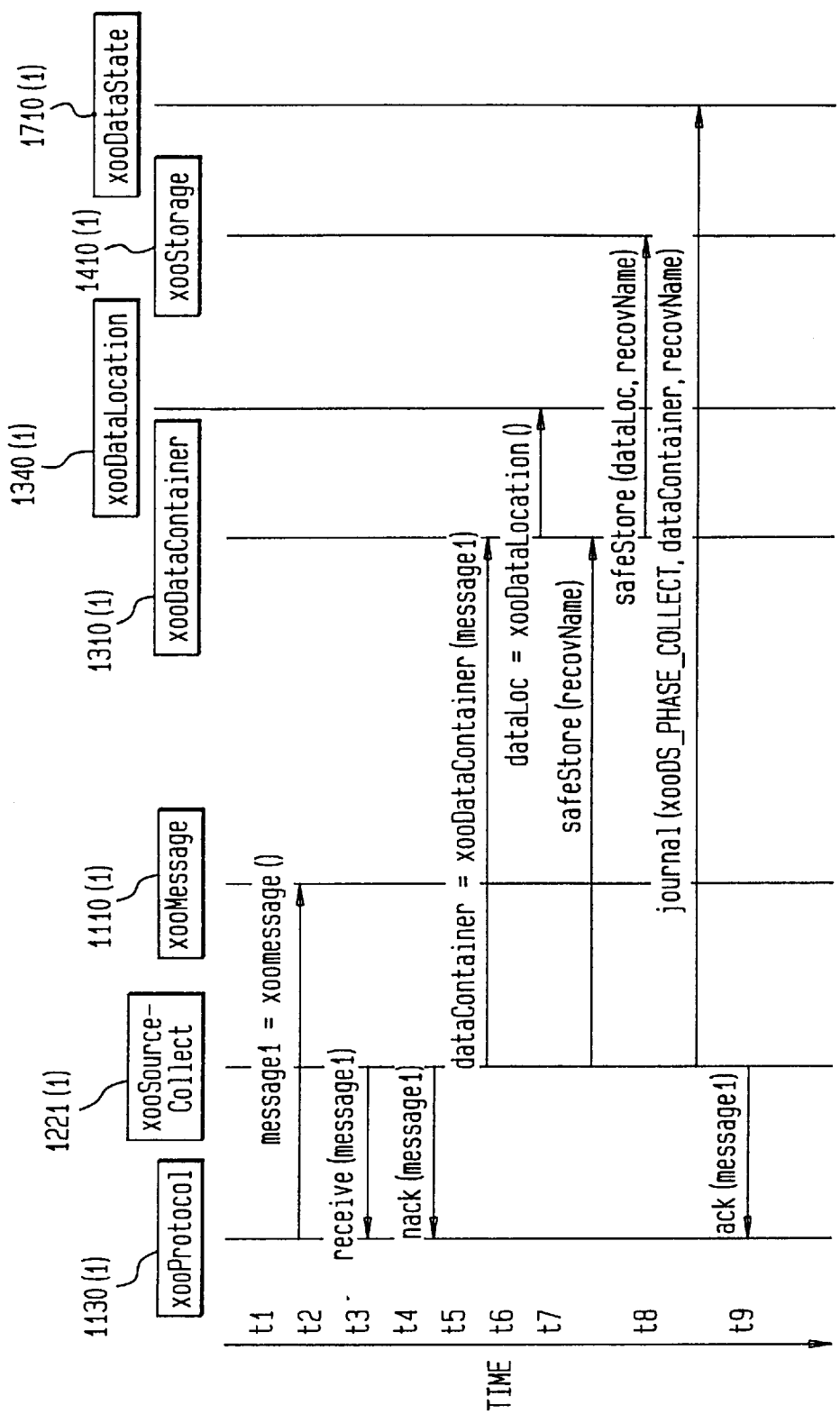

The arguments required to invoke the operation to journal source collection include xoo_DS_PHASE_COLLECT, which is an integer that indicates the source collection process (see FIGS. 12 and 13). The remaining arguments are xooDataContainer, an object of the xooDataContainer class, and tempName, a string (explained below with reference to FIGS. 11 and 12). This operation is used to record the source collection phase of the data network application's 18 data state.

Figure 14:
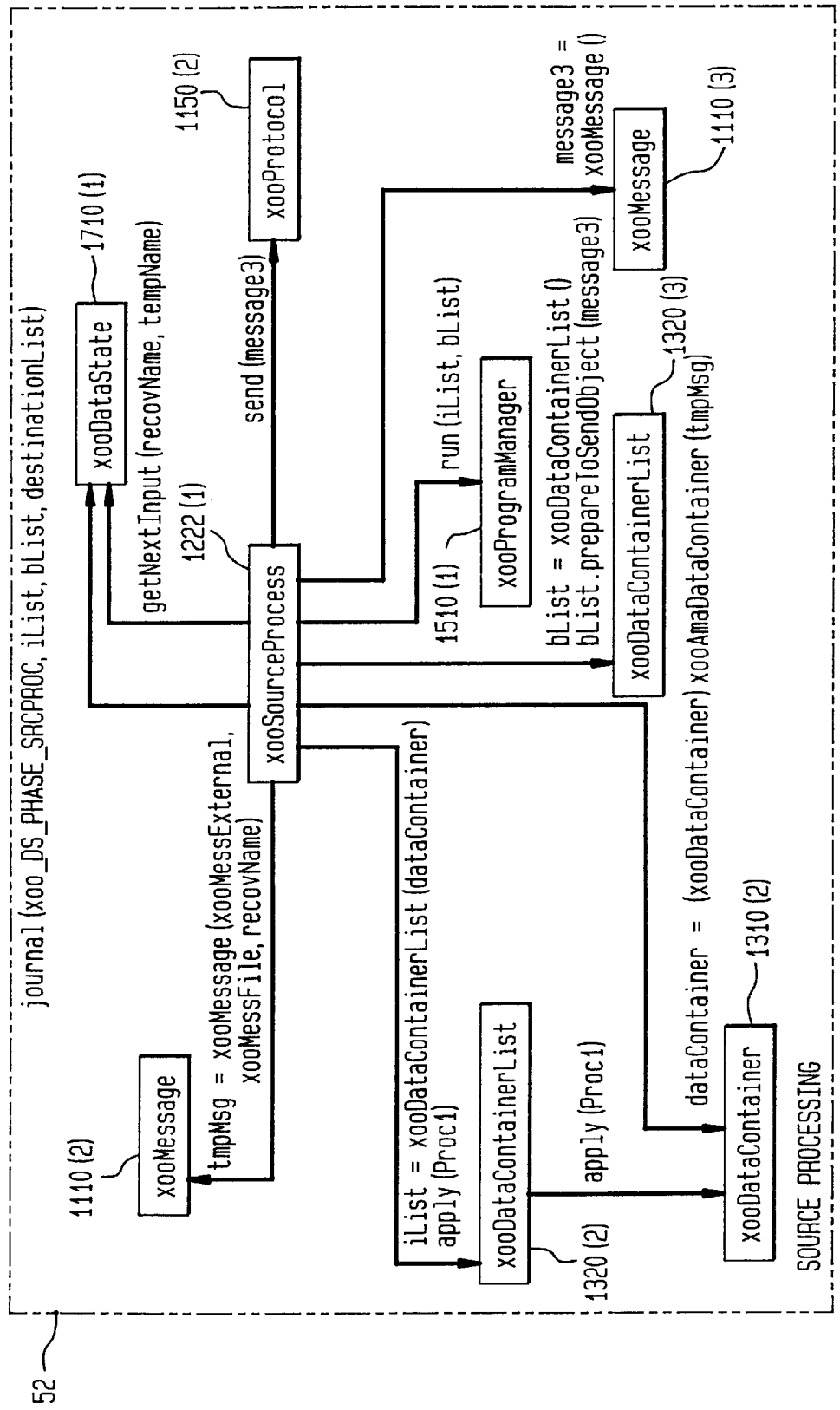
FIGS. 14 and 15 are block diagrams showing an operation of a source processing component in accordance with an embodiment of the preferred implementation, specifically.
Figure 15:
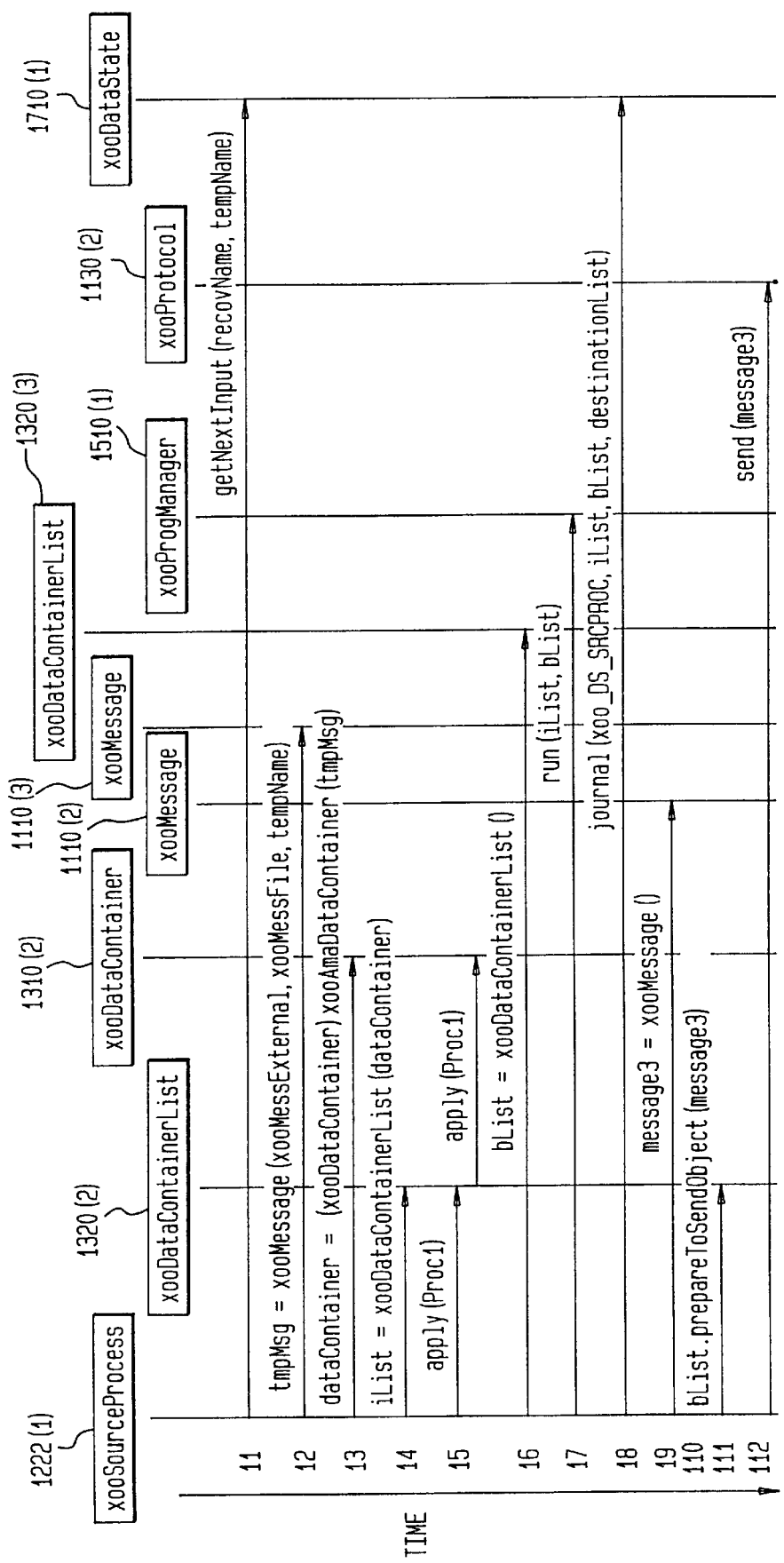

The arguments required to invoke the operation to journal source processing include xoo_DS_PHASE_SRCPROC, which is an integer that indicates source processing (see FIGS. 14 and 15). The remaining arguments are an object of the xooDataContainerList class 320, another object of the xooDataContainerList class 320, and an object of the xooArglist class (discussed below). This operation is used to record the source processing phase of the data network application's 18 data state.

Figure 18:
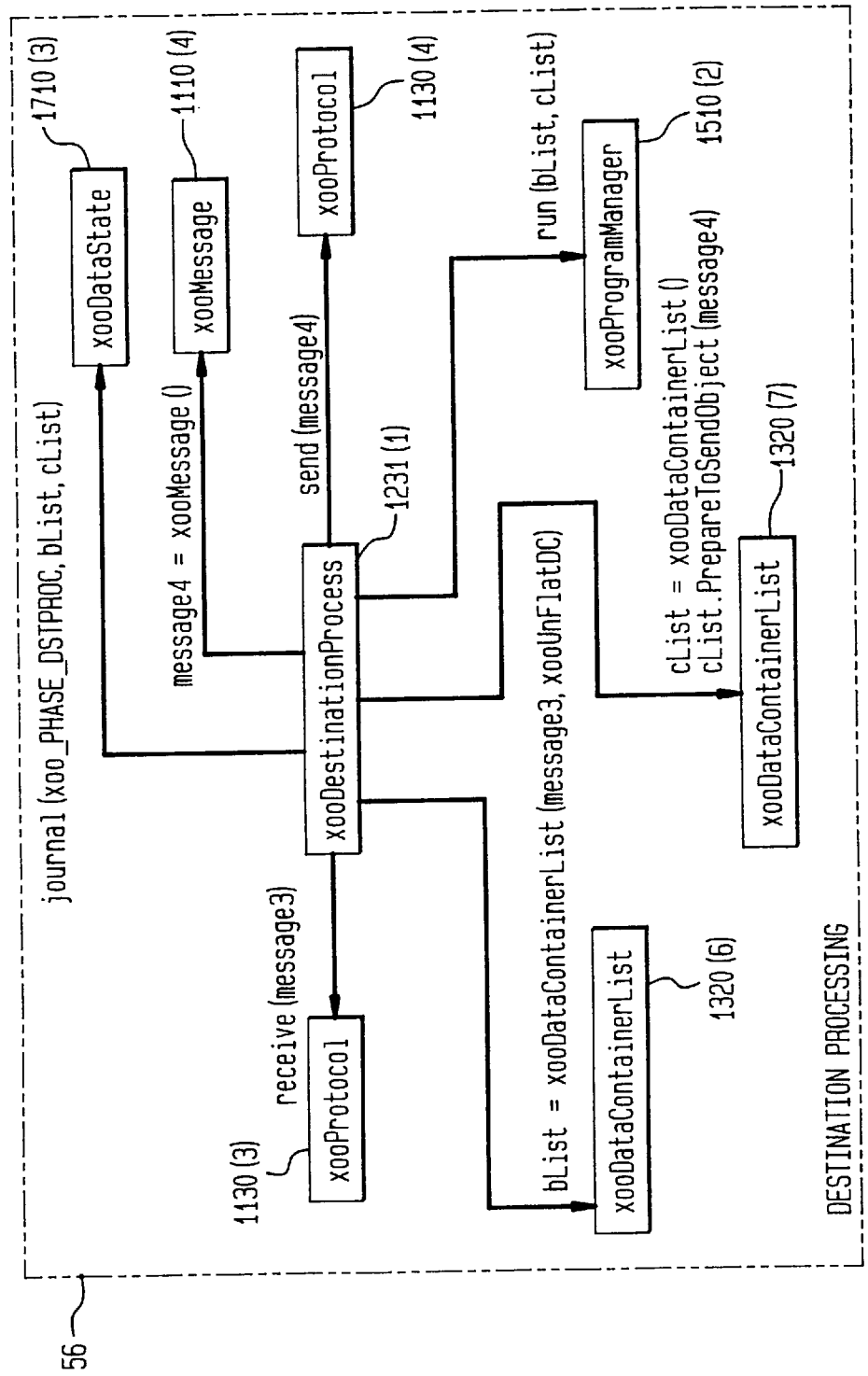
FIGS. 18 and 19 are block diagrams showing an operation of a destination processing component in accordance with an embodiment of the preferred implementation, specifically.
Figure 19:
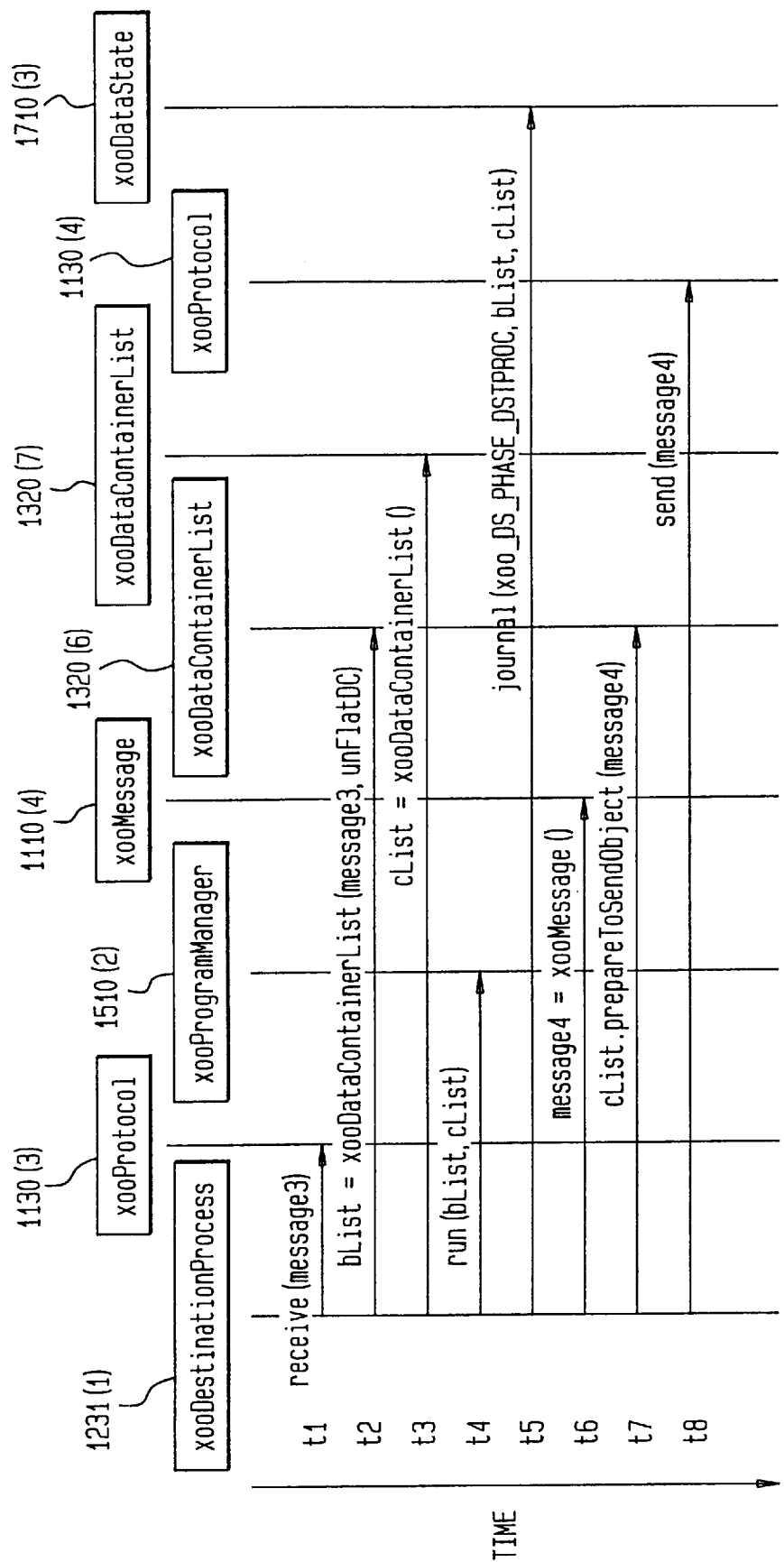

The arguments required to invoke the operation to journal destination processing include xoo_DS_PHASE_DSTPROC, which is an integer that indicates destination processing (see FIGS. 18 and 19). The remaining arguments are an object of the xooDataContainerList class 320 (that contain the output of source processing and is the input to destination processing, an "in list") and another object of the xooDataContainerList class 320 (that contain the output of destination processing, an "out list"). This operation is used to record the destination processing phase of the data network application's 18 data state. The data state of the system is recorded in a journal for recovery processing.

Figure 20:
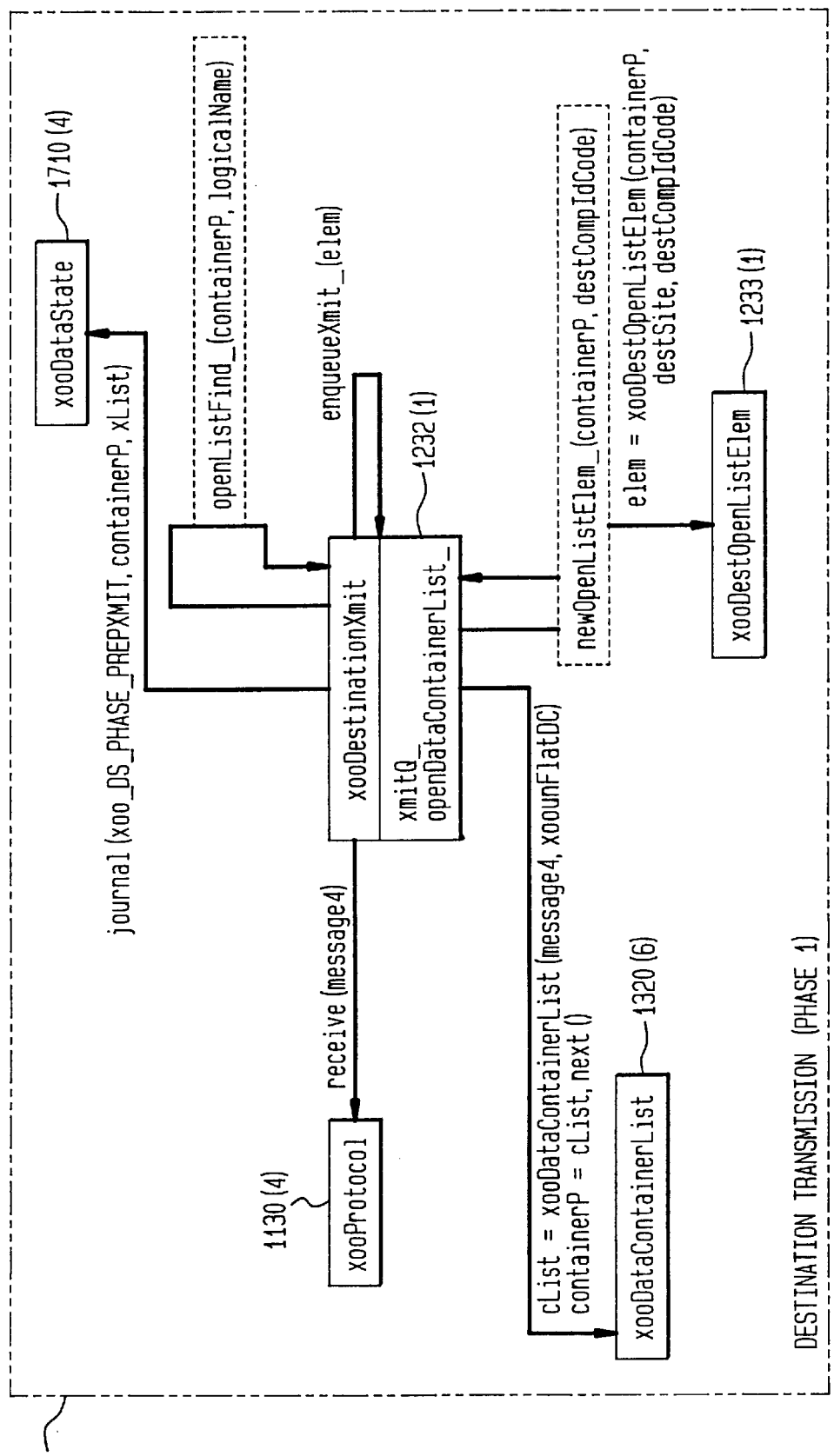
FIGS. 20–23 are block diagrams showing an operation of a destination transmission component in accordance with an embodiment of the preferred implementation, specifically.
Figure 21:
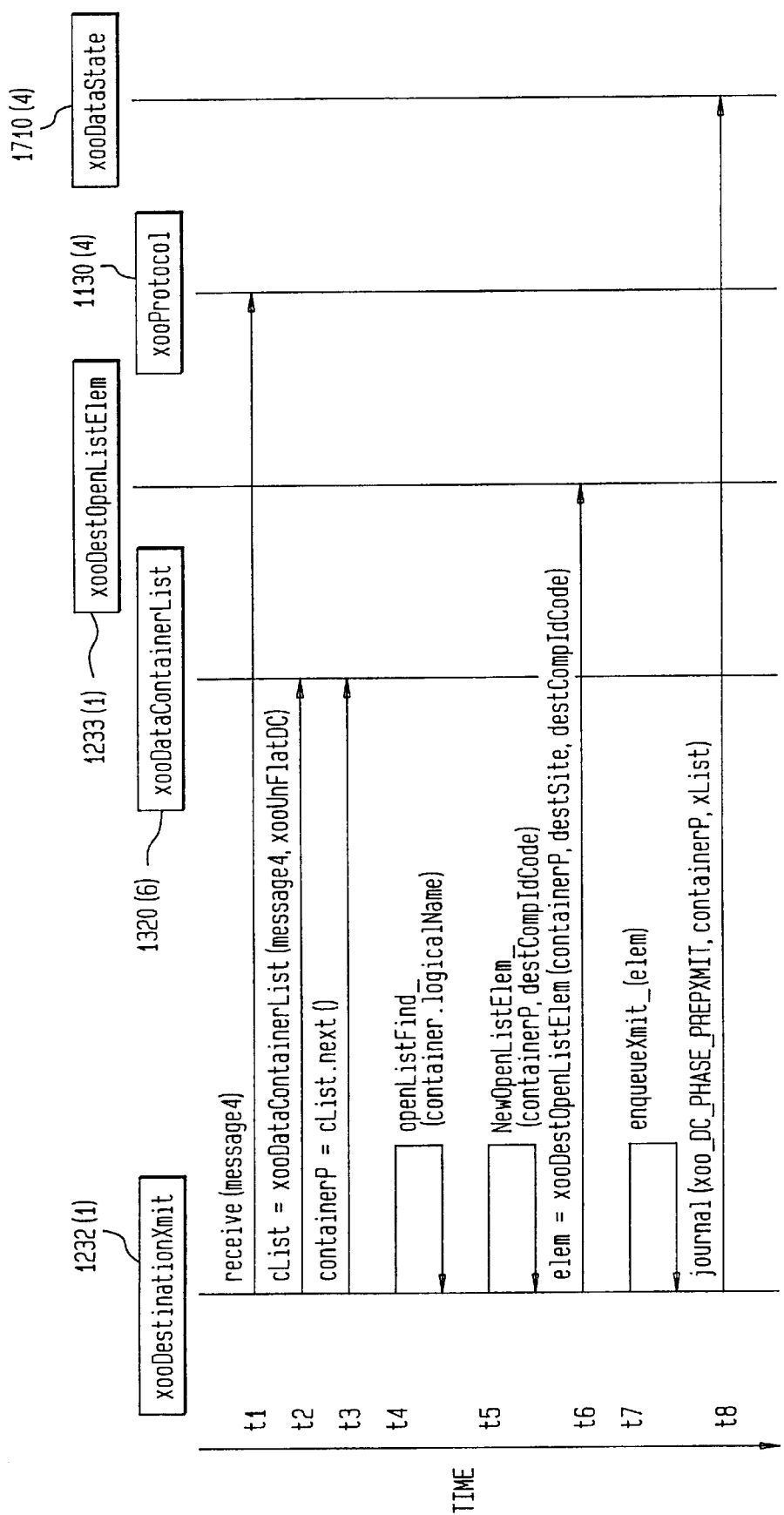

The arguments required to invoke the operation to journal prepare for transmission include xoo_DS_PHASE_PREXMIT, an integer that indicates the data state of application 18 before the destination transmission (see FIGS. 20 and 21). The remaining arguments include an object of the xooDataContainer class 310 and an object of the xooDataContainerList class 320. This operation is used to record the prepare for transmission phase of the data network application's 18 data state.

Figure 22:
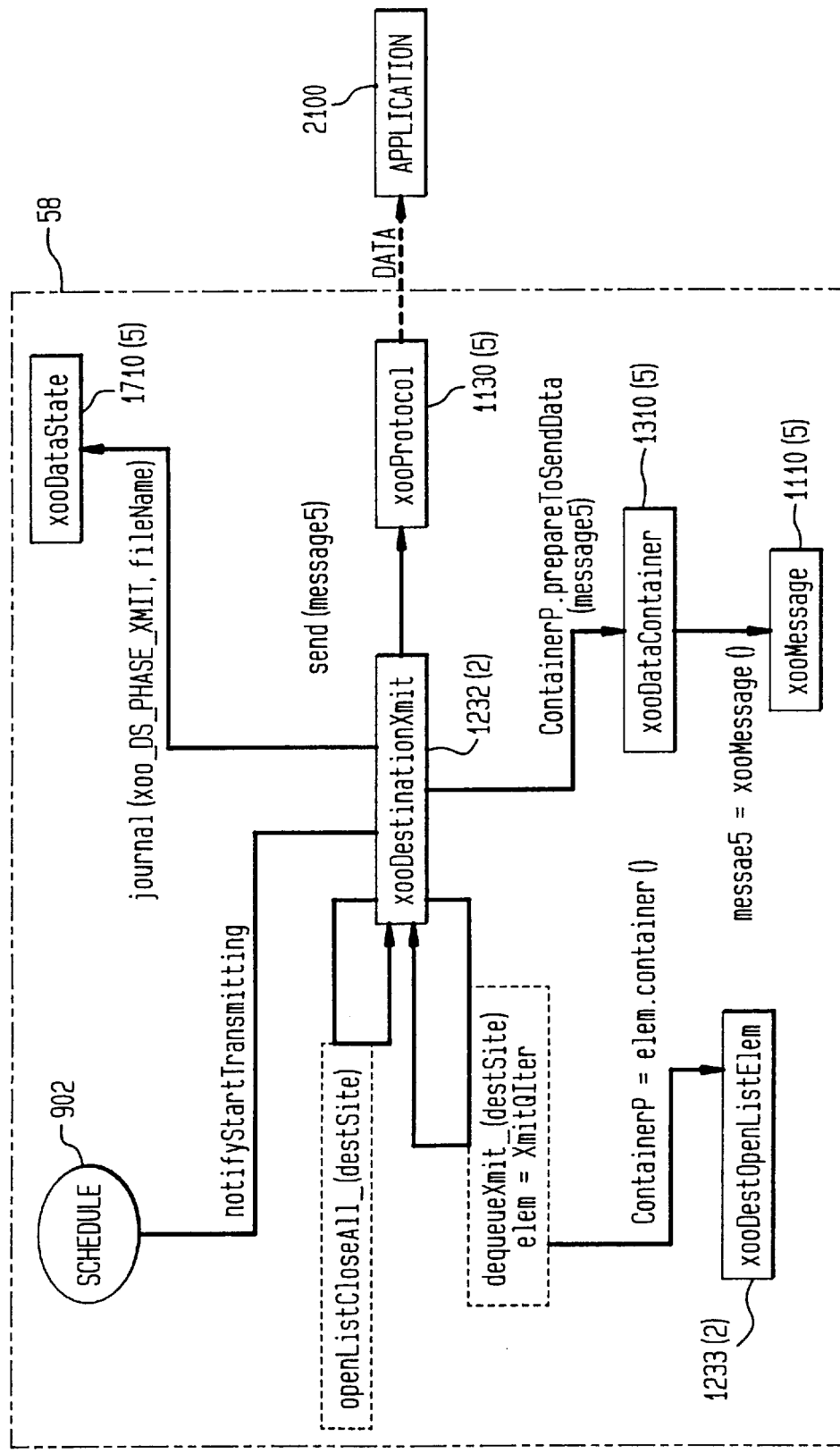
Figure 23:
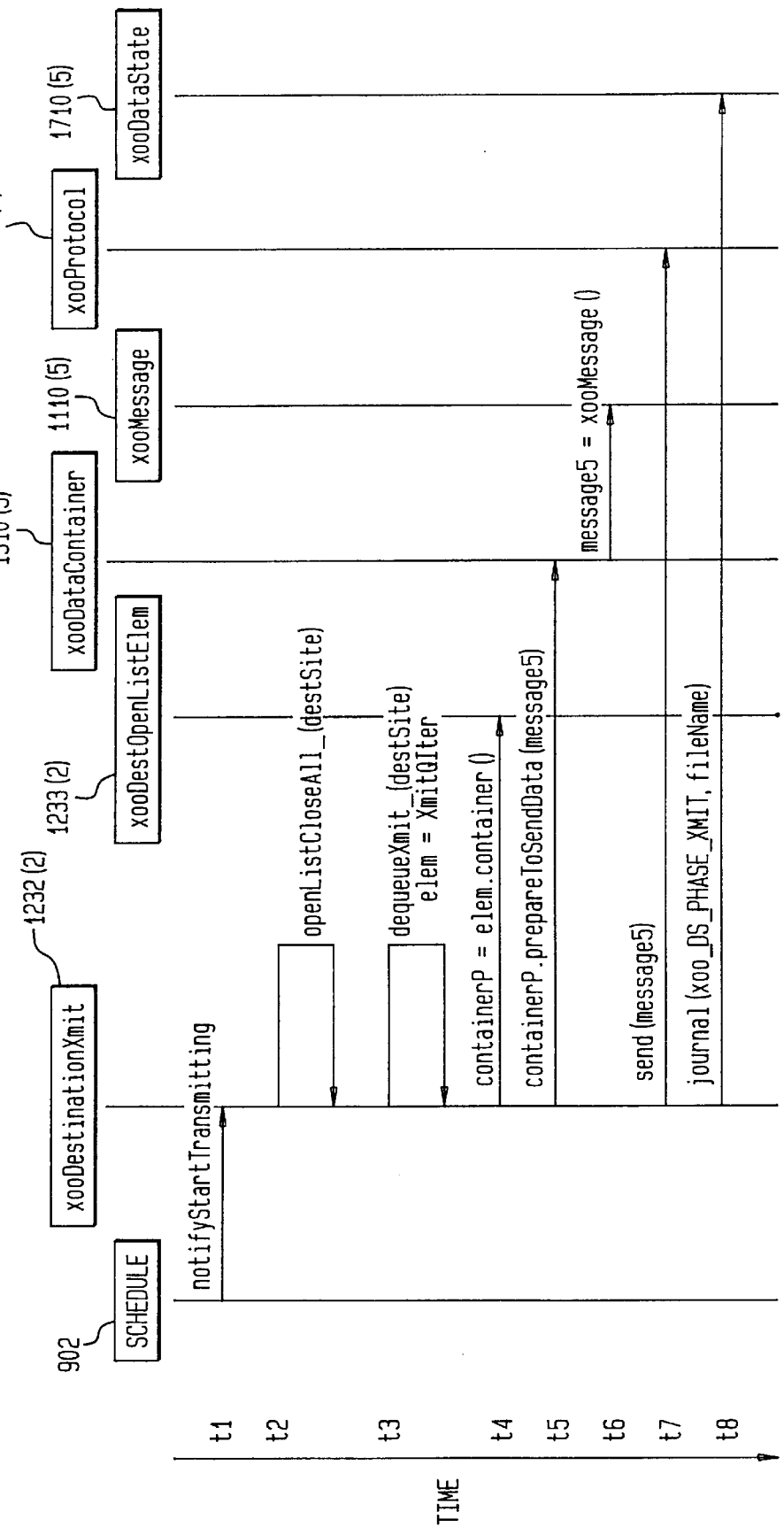

Finally, the arguments required to invoke the operation to journal destination transmission include xoo_DS_PHASE_XMIT, an integer that indicates the data state of application 18 at the destination transmission processing (see FIGS. 22 and 23). The remaining argument is a fileName, which corresponds to a data name for the file being transmitted by the data network application 18. This operation is used to record the destination transmission phase of the data network application's 18 data state for recovery processing.

Another xooDataState operation is getNextInput( ). This operation has two arguments, recovName and tempName. As discussed below, either of these arguments identifies a file name for data that came from a data generating system and was contained in a xooDataContainer object.

xooArglist class 720 is used to define the various arguments to be used when invoking operations on objects of various classes. These processes will be discussed more fully below. The xooArglist( ) operation is used to instantiate the xooArglist class 720.

In addition to the classes described above with regard to FIGS. 4–10, the data network application 18 uses other classes of objects, the details of which are not required to understand the present invention.

D. The Data Network Application Operation

There are five process components to the operation of the data network application 18, which are used to process input data from data generating systems (e.g., system 20 and 22) and output processed data to applications (e.g., applications 30 and 32). These process components are the source data collection and safestoring component 50, source processing component 52, user program processing component 54, destination processing component 56, and destination transmission component 58, all of which have been discussed briefly. Each of these process components will be explained in detail below.

One way of illustrating operation of object-oriented processes is to describe them in terms of invoking operations on objects in defined classes. This invocation causes certain operations to be applied to those objects, which in turn leads to the invocation of other operations on objects of the classes. In FIGS. 12, 14, 16, 18, 20, and 22, the invocation process is illustrated by the arrows pointing to objects. An arrow pointing to an object means that an operation is being invoked on the object that is being pointed to.

Because operations are invoked on objects of classes, objects of classes are numbered in the figures using the number of a class preceded by a "1." For example, the number for the xooMessage class is 110. To show an object of the class 110, a "1" is added in front of the number for the class; thus, the number "1110" is used to identify an object of the xooMessage class 110. Because during operation of the preferred implementation more than one object of the same class may be created, the numbers for all objects are also succeeded by a number in parentheses that indicates the number of the object. For example, the number 1110(1) indicates the an object of the xooMessage class 110 and the number 1110(4) also indicates an object of the xooMessage class 110. The first xooMessage object 1110(1), however, is a different instance (or object) of the xooMessage class 110.

(1) Main

When a user starts the data network application 18, a main process 900 begins executing in the workstation 10. The main process 900 is illustrated in FIG. 11.

At the root of the main process 900 is a system manager process 902. System manager 902 initiates the other processes of the data network application 18, so system manager 902 determines when other processes are initiated. The six processes shown in FIG. 11 are: SourceCollect 904, SourceProcess 906, DestinationProcess 908, Schedule 909, DestinationXmit 910, and Recover 911. The process Recover 911 restores the state of the data processing. The process Schedule 909 manages notifications that must occur at certain configured times. The processes 904, 906, 908, and 910 invoke operations to create objects of the xooSourceCollect class, the xooSourceProcess class, the xooDestinationProcess class, and the xooDestinationXmit class, respectively. SourceCollect process 904 invokes the operation to create xooSourceCollect object 1221(1), SourceProcess process 906 invokes the operation to create xooSourceProcess object 1222(1), DestinationProcess process 908 invokes the operation to create xooDestinationProcess object 1231(1), and DestinationXmit process 910 invokes the operation to create the xooDestinationXmit object 1232(1). Once these objects are created, processing continues in the manner described below with reference to FIGS. 12–23.

As explained in more detail below with reference to FIGS. 22–23, the schedule process 909 notifies the xooDestinationXmit object 1232(1) to begin processing in response to commands from the system manager 902. This notification is illustrated in the main 900 by the circle at the end of the lines from the Schedule process 909 to the xooDestinationXmit object 1232(1).

Processes 904, 906, 908, and 910 invoke other operations, including operations to create other objects. Further, in the following description, operations are at times invoked on other objects without first specifying the creation of the objects being operated on. As the creation of objects is the precursor to invoking operations on the objects, one skilled in the art will recognize that all objects (not specified otherwise) must have been previously created prior to the invocation of any operations on them.

(2) Source Data Collection and Safestoring

FIGS. 12 and 13 show object-oriented data process flow of the source data collection and safestoring component 50. FIG. 12 shows the interaction of objects of the classes of the data network application 18 during operation of the source data collection and safestoring component 50, and FIG. 13 is a corresponding event trace (timing) diagram that illustrates the order of steps for the object interaction shown in FIG. 12. These figures must be read together because, while one is used to illustrate object interaction, the other provides further details on the order in which the objects interact.

In the event trace diagram in FIG. 13, each object is represented as a vertical line and each event (see definitions section above) as a horizontal arrow from the sender object to the receiver object. Time increases from top to bottom, but the spacing is irrelevant; it is only the sequence of events that are shown, not their exact timing.

Processing of the source data collection and safestoring component 50 is initiated when data is received from data generating system 1100. As explained above, data generating system 1100 may be, for example, a telephone switch. Data generating system 1100 may also be an intelligent telephone network, like one that provides a single telephone number for a user and connects callers to that user regardless of where the user is at any time (e.g., in the home, car, plane, etc.).

FIGS. 12 and 13 show that when data is received from data generating system 1100, an object 1130(1) of the xooProtocol class 130 invokes the xooMessage( ) operation on the xooMessage class 110 (step t1). (The xooProtocol object 1130(1) was previously created.) This invocation instantiates the xooMessage class 110, or creates a xooMessage object 1110(1). This is illustrated in FIG. 12 by the arrow pointing from the xooProtocol object 1130(1) to the xooMessage object 1100(1). The created xooMessage object 1110(1) is set equal to the variable "message1." This is shown in FIG. 12 by "message1=xooMessage( )." Similar notation, which is common C++ notation, is used throughout the remaining description. Next, the xooSourceCollect object 1221(1) invokes the receive( ) operation on the xooProtocol object 1130 with the message1 as an argument (step t2). As explained above, the receive( ) operation is used by the xooProtocol object 1130(1) to receive a xooMessage object (i.e., message1). In other words, the xooSourceCollect object 1221(1) invokes the receive( ) operation on the xooProtocol object 1130(1) to cause the xooProtocol object 1130(1) to receive the xooMessage object 1110(1) (i.e., message1). Internally within the xooProtocol object, a xooTransport object is created and the receive( ) on the Protocol object in turn results in the invocation of the receive( ) operation on the xooTransport object. This receive( ) on the xooTransport object does the actual work by receiving the xooMessage object.

If the receive( ) operation is unsuccessful (step t2), then the xooSourceCollect object 1221(1) invokes the nack( ) operation (step t3), which signals the unsuccessful receive ( ) operation. If this is the case, then the data generating system 1100 has to resend the data. If the receive( ) operation was, however, successful then the nack( ) operation is not invoked.

The xooSourceCollect object 1221(1) invokes the xooDataContainer( ) operation to create a xooDataContainer object 1310(1) (step t4). This is illustrated in FIG. 12 by "dataContainer=xooDataContainer(message1)." This C++ notation indicates that the variable "datacontainer" is set equal to the result of the invocation of the xooDataContainer( ) operation with message1 as the argument. As explained above, this xooDataContainer( ) operation will create the xooDataContainer object 1310(1) with message1 in the xooDataContainer object 1310(1). The variable dataContainer is set equal to the xooDataContainer object 1310(1).

After the xooDataContainer object 1310(1) is created (step t4), the xooDataContainer object 1310(1) invokes the xooDataLocation( ) operation on an object of the xooDataLocation class 340 (step t5). This invocation will create a xooDataLocation object 1340(1). As notated in FIG. 12, a variable "dataLoc" is set equal to the xooDataLocation object 1340(1).

The xooSourceCollect object 1221(1) invokes the safeStore( ) operation on the xooDataContainer object 1310(1) to safestore that object using a special variable name, "recovName", which will make it easier to recover the object 1310(1) should processing fail during operation of the component 50 (step t6).

Then the xooDataContainer object 1310(1) invokes the safeStore( ) operation on a xooStorage object 1410(1) (step t7). This operation requires two variables, dataLoc and recovName. The variable dataLoc was defined in step t5 and recovName is a string.

Then the xooSourceCollect object 1221(1) invokes the journal( ) operation on a xooDataState object 1710(1) (step t8). This operation requires three variables: xoo_DS_PHASE_COLLECT, dataContainer, and recovName. The first of these variables indicates the type of journal( ) operation that has been invoked, namely, a journal( ) operation during the execution of the source data collection and safestoring component 50. (Since the components 50–58 of the data network application 18 are asynchronous, meaning that they run independently and simultaneously, it is important to record the state of data processed by each component separately for error recovery processing.) The dataContainer variable is associated with the xooDataContainer safestored and recovName, the special file name used to recover xooDataContainer 1310(1).

A temporary copy, named tempName, of the file for recovName is created within the xooDataState object 1710(1). tempName will be described further below.

Next, the xooSourceCollect object 1221(1) invokes the ack( ) operation on the xooProtocol object 1130(1) (step t9). This operation signals the successful receipt of data.

Thus, data from data generating system 1110 is safestored and journaled to provide fail safe error recovery processing.

(3) Source Processing

Object-oriented data process flow of the source processing component 52 is illustrated in FIGS. 14 and 15. FIG. 14 shows the interaction of objects of the classes of the data network application 18 during operation of the source processing component 52, and FIG. 15 is a corresponding event trace diagram that illustrates the order of steps for the object interaction shown in FIG. 14. These figures must be read together because, while one is used to illustrate object interaction, the other provides further details on the order in which the objects interact.

In the first interval of operation of the source processing component 52, a xooSourceProcess object 1222(1) invokes the getNextInput( ) on xooDataState object 1710(1) (step t1). The arguments are recovName and tempName, and under-normal processing the getNextInput( ) operation would return the file for tempName. (However, if recovery processing is being done the file for recovName is returned.) The xooSourceProcess object 1222(1) invokes a xooMessage( ) operation: tmpMsg=xooMessage (xooMessExternal, xooMessFile, tempName) (step t2). This step creates a temporary xooMessage object, namely, tmpMsg, using the file for tempName. xooMessExternal and xooMessFile are integers, with xooMessExternal identifying a data generating system and xooMessFile indicating that the data from that data generating system is in a file.

The xooSourceProcess object 1222(1) then invokes an operation on xooDataContainer 1310(2) (step t3). This operation reads dataContainer=(xooDataContainer) xooAmaDataContainer(tmpMsg), which means xooSourceProcess object 1222(1) is invoking the xooAmaDataContainer( ) operation with tmpMsg as the argument, which is a xooMessage object (see step t2). The notation indicates the invocation of a xooAmaDataContainer( ) operation on a xooAmaDataContainer object and making a xooDataContainer object 1310 (2). "dataContainer" is set to the xooDataContainer object 1310(2).

Next, the xooSourceProcess object 1222(1) invokes the xooDataContainerList( ) operation on xooDataContainer- List object 1320(2) (step t4). This operation creates an object 1320(2) of the xooDataContainerList class 320. The notation shown in FIG. 14 for this operation invocation is "iList=xooDataContainerList(dataContainer)." This C++ instruction means that the iList variable gets set to the created xooDataContainerList 1320(2) containing the xooDataContainer object 1310(1), which is now identified by the variable name dataContainer.

With the xooDataContainer object 1310(1) in the xooDataContainerList object 1320(2), the apply( ) operation is invoked by the xooSourceProcess object 1222(1) on the xooDataContainerList object 1320(2) (step t5). In this step, the Proc1 process is applied to all objects of the xooDataContainer class 310 contained in the xooDataContainerList object 1320(2) (i.e., xooDataContainer object 1310(1)). In this example, only one object of the xooDataContainer class 310 is in the xooDataContainerList object 1320(2), while objects of the xooDataContainerList class 320 may contain multiple objects of the xooDataContainer class 310. With more than one object of the xooDataContainer class 310 in the xooDataContainerList object 1320(2), the Proc1 process would be applied to all of those objects in the xooDataContainerList object 1320(2).

The Proc1 process is defined as a process of decompressing and de-encrypting the data defined by the objects of the xooDataContainer class 310, which are in turn defined by the xooDataContainerList object 1320(2). In other words, data from the data generating system 1100 (FIG. 11) is provided to the data network application 18 in a compressed and encrypted format. Proc1 decompresses and decrypts of that data.

Next, the xooDataContainerList object 1320(2) invokes the apply( ) operation on the xooDataContainer object 1310(2) with the argument Proc1 (step t6). This instructs the invocation of Proc1 on the xooDataContainer object 1310 (2). (The operations in steps t5 and t6 constitute a loop, but this description only includes one iteration of the loop.)

The xooSourceProcess object 1222(1) invokes the xooDataContainerList( ) operation to create a new xooDataContainerList object 1320(3) (step t7). The new object 1320(3) is set equal to the variable name bList as indicated in the C++ instruction: "bList=xooDataContainerList( )." The xooSourceProcess object 1222(1) invokes the run( ) operation on an object 1510 of the xooProgramManager class 510 (step t8). This operation has two arguments, the iList and the bList. As explained above, both the iList and bList are objects of the xooDataContainerList class 320. The differences between these objects have already been explained, i.e., the bList is empty, while the iList is not.

Next, the xooSourceProcess object 1222(1) then journals the data state of the source processing component 52 (step t9). This is done by invoking the journal( ) operation on an object 1710(2) of the xooDataState class 710. The arguments in this operation identify the source processing component 52, namely, "xoo_DS_PHASE_SRCPROC." The other arguments are iList, bList, and destinationList. The iList represents the state of the xooDataContainerList object 1320(2) before the apply( ) operation was invoked in step t5 and the bList represents the state of the xooDataContainerList object 1320(3) after the apply( ) operation was invoked in step t7. Finally, destinationList is a xooArglist object that specifies the logical name of the xooDestinationProcess object 1231(1).

The xooSourceProcess object 1222(1) invokes the xooMessage( ) operation to create another instance of the xooMessage class 110 (step t10). The new xooMessage object 1110(3) is set equal to the variable name message3.

The xooSourceProcess object 1222(1) invokes the prepareToSendObject( ) operation on the xooDataContainerList 1320(3) (step t11). As illustrated in FIG. 14, the C++ notation for this invocation is "bList.prepareToSendobject (message3)." This prepareToSendObject( ) operation prepares message3 with the xooDataContainerList object 1320 (3).

Having completed step t11, the xooSourceProcess object 1222(1) invokes the send( ) operation on an object 1130(3) of the xooProtocol class 130 (step t12). The argument for this operation is message3, which, as explained, contains the bList (i.e., xooDataContainerList object 1320(3)).

During the operation of the source processing component 52, the bList is converted to message3 for transmission to the destination processing component 56 via an object 1130(3) of the xooProtocol class 130.

(4) User Program Processing

Figure 16:
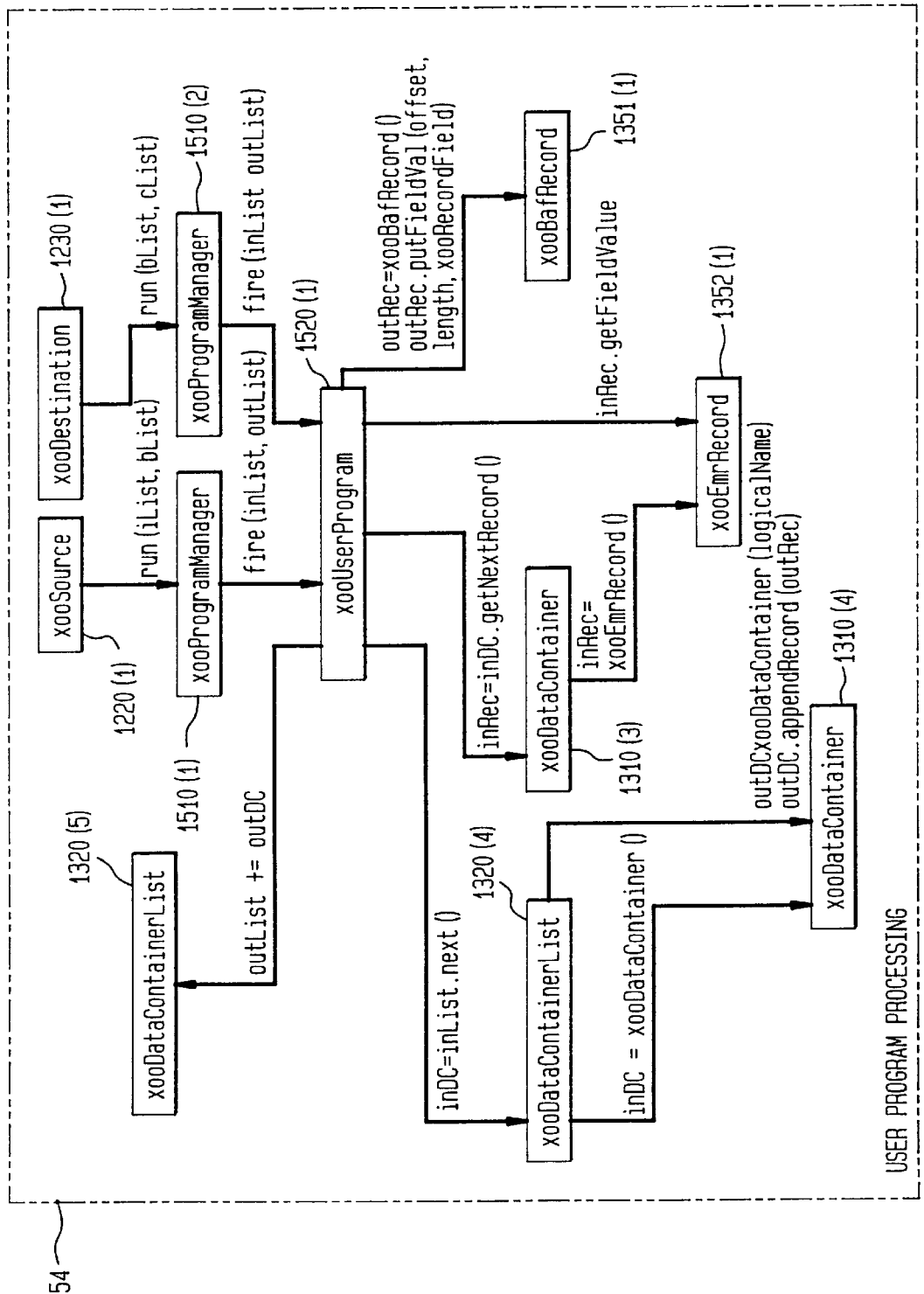
FIGS. 16 and 17 are block diagrams showing an operation of a user program processing component in accordance with an embodiment of the preferred implementation, specifically.
Figure 17:
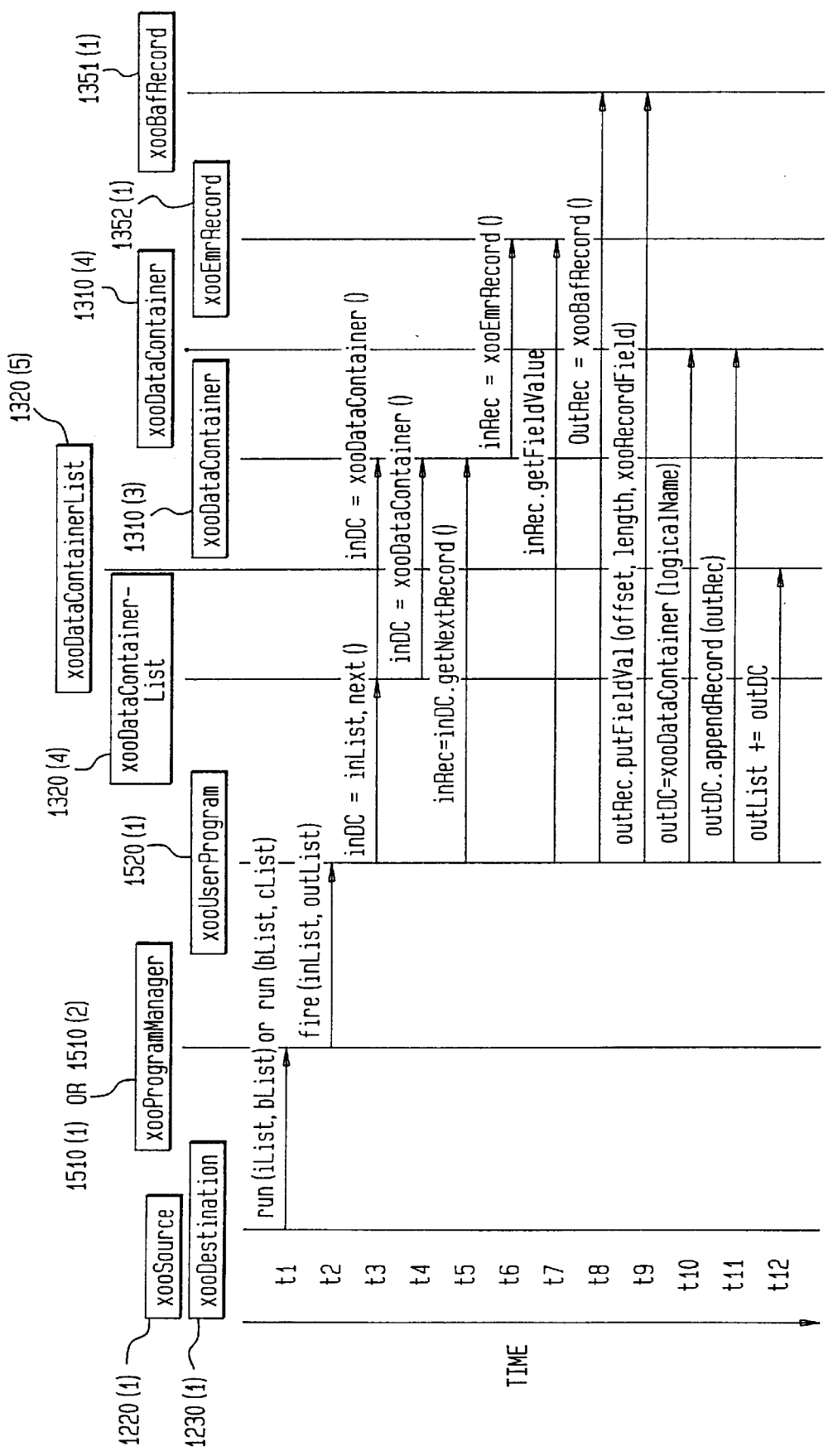

Object-oriented data process flow of an example of a user program processing component 54 is illustrated in FIGS. 16 and 17. FIG. 16 shows the interaction of objects of the classes of the data network application 18 during operation of the user program processing component 54, and FIG. 17 is a corresponding event trace diagram that illustrates the order of steps for the object interaction shown in FIG. 16. The user program processing component 54 may be separately executed by the source processing component 52 or the destination processing component 56.

The first step in processing by the user program component 54 occurs when an object 1220(1) of the xooSource class 220 invokes the run( ) operation on an object 1510(1) of the xooProgramManager class 510 (see FIG. 14) (step t1). Alternatively, an object 1230(1) of the xooDestination class 230 may invoke run( ) on another object 1510(2) of the xooProgramManager class 510 (see FIG. 18). Which object (1915(1) or 1510(2)) is invoked is determined by whether source process 906 has been started by the system manager 902 or destination process 908 has been started by system manager 902.

In the first case, the iList and bList in the run( ) operation from the object 1220(1) correspond to xooDataContainerList objects 1320(2) and 1320(3), respectively (see FIG. 14). In the second case, the bList and cList in the run( ) operation from the object 1510(1) correspond to xooDataContainerList objects 1320(6) and 1320(7), respectively (see FIG. 18). In either case, the object 1510(1) or object 1510(2) invokes the fire( ) operation on the xooUserProgram object 1520(1) (step t2). But when the xooProgramManager object 1510(1) invokes the fire( ) operation the iList and bList map to the inList and outList arguments of the fire( ) operation, and when the xooProgramManager object 1510(2) invokes the fire( ) operation the bList and cList map to the inList and outList arguments.

The xooUserProgram object 1520(1) invokes next( ) operation on an object 1320(4) of the xooDataContainerList class 320 (step t3). The C++ notation used in FIG. 16 is "inDC=inList.next( )." This means that the xooDataContainerList object 1320(4) is identified by the variable name "iList" and the nexto operation extracts that next object of the xooDataContainer class 310 from within the iList (or xooDataContainerList object 1320(4)) and sets the variable "inDC" equal to that extracted object.

The xooDataContainerList object 1320(4) invokes the xooDataContainer( ) to create the xooDataContainer object 1310(3) (step t4). The new xooDataContainer object 1310 (3) is set equal to the variable inDC.

The xooUserProgram object 1520 then invokes the getNextRecord( ) operation on the object 1310(3) of the xooDataContainer class 310 (step t5). The C++ notation for this is "inREC=inDC.getNextRecord( )." This translates to get the next record object from within the xooDataContainer object 1310(3), which DataContainer object 1310(3) is identified by the variable name "inDC", as discussed above. The record object taken from the xooDataContainer object 1310(3) is set equal to the variable "inRec." The xooDataContainer object 1310(3) invokes the xooEmrRecord( ) operation (step t6); thus, creating an object 1352(1) of the xooEmrRecord class 352.

Steps t7, t8, and t9 in FIG. 17 can be viewed as occurring as a unit. The xooUserProgram object 1520(1) invokes the getFieldValue( ) operation on the xooEmrRecord 1352 (step t7). The getFieldValue( ) operation is notated in FIG. 16 as "inRec.getFieldValue( )." The variable name "inRec" is the name of the variable assigned to the record taken from the xooDataContainer object 1310(3), and the operation extracts a data value from that inRec xooDataContainer object 1310(3). The xooUserProgram 1520(1) invokes the xooBafRecord( ) operation (step t8); thus, creating a xooBafRecord object 1351. That object 1351(1) is identified by the variable name "outRec", as specified in the C++ notation "outRec=xooBafRecord( )." The xooUserProgram object 1520(1) takes the value from the record taken from the xooEmrRecord 1352(1) in steps 6 and puts that value in the created xooBafRecord object 1351(1) at the location in the xooBafRecord object 1351(1) specified by the arguments in the operation (step t9). Again, the xooBafRecord 1351(1) is identified by the variable outRec so the C++ notation for this step is "outRec.putFieldVal(offset,length, xooRecordField)." This operation creates xooRecordField object corresponding to the field within the xooBafRecord object 1351(1) that is being updated. The value attribute of the of xooRecordField object is then populated in the xooBafRecord 1351(1) at the appropriate position based on the offset and length arguments.

Then the xooUserProgram object 1520(1) invokes the xooDataContainer( ) operation to create another object 1310 (4) of the xooDataContainer class 310 (step t10). This operation is illustrated in FIG. 16 by the C++ notation "outDC=xooDataContainer(logicalName)", in which the argument logicalName is the destination for which the data in the xooDataContainer is intended. The xooUserProgram object 1520(1) invokes the appendRecord( ) operation on the object 1310(4) (step t11). In the C++ notation of FIG. 16, "outDC.appendRecord(outRec)", "outRec" is the variable name for an object of the xooRecord class 350 contained within the object 1310(4), which is being identified by the variable name "outDC."

The last step of the user program processing component 54 is specified in C++ notation as "outList+=outDC" (step t12). This means that the xooDataContainerList object 1320 (5), which is identified by the variable name "outList", and adding to that object 1320(5) the xooDataContainer object 1310(4) identified by the variable name "outDC."

As a result of the operation of the user program processing component 54, explained above, a value from one record (i.e., a xooEmrRecord object) is placed in an appropriate location in a another record (i.e., a xooBafRecord). This operation may be done multiple times for many record values as well as many records using the container structures identified as objects of the xooDataContainer class 310 and the xooDataContainerList class 320.

It is the second record that may be used by the applications 30 and 32. But first, destination processing of component 56 and destination transmission processing of component 58 must be performed.

(5) Destination Processing

Object-oriented data process flow of the destination processing component 56 is illustrated in FIGS. 18 and 19. FIG. 11 shows the interaction of objects of the classes of the data network application 18 during operation of the destination processing component 56, and FIG. 19 is a corresponding event trace diagram that illustrates the order of steps for the object interaction shown in FIG. 18.

The xooDestinationProcess object 1231(1) invokes the receive( ) operation on the xooProtocol object 1130(3) to receive the xooMessage object identified by the variable name message3 (receive(message3) in the C++ notation) (step t1).

The xooDestinationProcess object 1231 invokes the xooDataContainerList( ) operation on an object 1320(6) of the xooDataContainerList class 320 (step t2). This operation creates a new object 1320(6) of that xooDataContainerList class 320. As illustrated in FIG. 18, the C++ notation for this operation is "bList=xooDataContainerList(message3, xooUnFlatDC)." This instruction creates the xooDataContainerList object 1320(6) and assigns it to the variable name bList. In this operation an empty xooDataContainerList object is created, a xooUnFlatDC object is created, and data within message3 is converted by the xooUnFlatDC object into xooDataContainer objects and inserted into xooDataContainerList object.

Next, the xooDestinationProcess object 1231(1) invokes the xooDataContainerList( ) operation on an object of the 1320(7) to create a new instance of the xooDataContainerList class 320 (step t3). The new object is set equal to the variable cList.

Next, the xooDestinationProcess object 1231 invokes the run( ) operation on an object 1510(2) of the xooProgramManager class 510 (step t4). The arguments for this operation are the bList (xooDataContainerList object 1320(6)), which represents an object of the xooDataContainerList class 320 provided to the xooProgramManager object 1510 (2) and a cList, which represents an object 1320(7) of the xooDataContainerList class 320.

The xooDestinationProcess object 1231(1) invokes a xooMessage( ) operation to create a new instance 1110(4) of the xooMessage class 110 (step t5). The new object 1110(4) is set equal to the variable message4.

The xooDestinationProcess object 1231 invokes the journal( ) operation on an object 1710(3) of the xooDataState class 710 (step t6). The argument for this operation, xoo_DS_PHASE_DSTPROC, signals that object 1710(3) that the data state being journaled (or recorded) corresponds to processing being done by the destination processing component 56. The remaining arguments are bList and cList. As explained, both of these are variable names for objects (i.e., object 1320(6) and object 1320(7)) of the xooDataContainerList class 320.

The xooDestinationProcess object 1231 invokes the prepareToSendobject( ) operation on the cList xooDataContainerList object 1320(7) (step t7). This operation takes the cList object 1320(7) and places it into a xooMessage object, message4. Finally, the xooDestinationProcess object 1231 invokes the send( ) operation on a xooProtocol object 1130(4) to send the xooMessage object 1130(4), i.e., message4, to the destination transmission component 58 for processing (step t8).

(6) Destination Transmission

Object-oriented data process flow of the destination transmission component 58 is illustrated in FIGS. 20–23. FIGS. 20 (Phase 1) and 22 (Phase 2) show the interaction of objects of the classes of the data network application 18 during operation of the destination processing component 58, and FIGS. 21 and 23 are corresponding event trace diagrams that illustrate the order of steps for the object interaction shown in FIGS. 20 and 22, respectively.

The xooDestinationXmit object 1232(1) controls the object interaction during Phase 1 of the operation by the destination transmission component 58. The xooDestinationXmit object 1232(1) first invokes a receive( ) operation on the xooProtocol object 1130(4) to receive the xooMessage object 1110(4), which is identified by the variable name message4 (step t1).

The xooDestinationXmit object 1232(1) then invokes the xooDataContainerList( ) operation on a xooDataContainer object 1320(6) (step t2). The C++ instruction for this operation is "cList=xooDataContainerList(message4, xooUnFlatDC)." This operation sets the variable cList as the identifier for the object 1320(6). In this operation an empty xooDataContainer object 1320(6) is created, a xooUnflatDC object is created (not shown), and data within message4 is converted by the xooUnFlatDC object into xooDataContainer objects and inserted into the xooDataConatinerList object.

The xooDestinationXmit object 1232(1) then invokes the next( ) operation on the xooDataContainerList object 1320(6) (step t3). This set in C++ instruction format reads "containerP=cList.next( )", and containerP is set equal to the next xooDataContainer object in list object 1320(6). The next object of the xooDataContainer class 310 is extracted from within the cList (or xooDataContainerList object 1320(6)) and is set to variable containerP.

The xooDestinationXmit object 1232(1) then invokes two operations on itself (steps t4 and t5). In step t4, xooDestinationXmit object 1232(1) invokes the openListFind_( ) operation with the argument "containerP.logicalName". This operation takes the xooDataContainer object defined by containerP, and tries to match the data container with an already existing open data container, i.e., xooDestOpenListElem object. Matching here means comparing the logical names of the data container and the open data container. The argument is the logical name of the containerP. If openListFind_( ) does not find a match, xooDestinationXmit object 1232(1) invokes another operation on itself: "newOpenListElem_(containerP,destCompIdCode)" (step t5). This operation in turn invokes another operation, "elem= xooDestOpenListElem(containerP,destSite,destCompIdCode) to create a new object of xooDestOpenListElem class 233 using a xooDataContainer object, i.e., containerP, and the destCompIDCode and destSite (step t6). However, if openListFind_( ) does find a match, then containerP is simply added to the matching open data container (i.e., a xooDestListElem object that already exists). This internal function is within openListFind_( ) is not shown in FIG. 20.

The xooDestinationXmit object 1232(1) then invokes its enqueueXmit_( ) operation on elem (step t7). elem is the xooDestOpenListElem object created in step t6. This queues an object of the xooDestOpenListElem class 233, i.e., elem, for later dequeuing and transmission.

Finally, the xooDestinationXmit object 1232(1) invokes the journal( ) operation on a xooDataState object 1710(4) to journal the current data state during Phase 1 of the operation of the destination transmission component 58 (step t8). This operation has three arguments. The first is xoo_DS_PHASE_PREXMIT, which indicates that the state being journaled is the phase 1 operation of the destination transmission component 58. The second argument containerP is described above and the third is xList, which is list of all data containers from cList (described earlier) that went into xooDestOpenListElam either by openListFind_( ) or by newOpenListElem, both described earlier.

The second phase of operation of the destination transmission component 58 is illustrated in FIGS. 22 and 23. Phase 2 processing begins when the schedule process 909 notifies the xooDestinationXmit object 1232(2) to begin transmitting to an application 2100 (e.g., application 30 or 32 in FIG. 1) (step t1).

The xooDestinationXmit object 1232(2) then invokes an operation on itself to openListCloseAll_(destSite) (step t2). This operation closes all the open data containers at destSite.

Next, the xooDestinationXmit object 1232(2) invokes another operation on itself, namely, dequeueXmit_(destSite) (step t3). As explained above, this operation dequeues objects of the xooDestOpenListElem class 233 for transmission. The variable elem is set to the xooDestOpenListElem object 1233(2) dequeued, with the xmitQIter iterator choosing the next object of class 233 to be dequeued. For this operation to be completed, the xooDestOpenListElem is obtained from xmitQIter and set to elem. Then the variable name containers is set to the xooDataContainer object 1310(5) obtained by invoking the container( ) operation of elem (i.e., xooDestOpenListElem object 1233(2)) (steo t4).

Then, the xooDestinationXmit object 1232(2) invokes an operation containerP.prepareToSendData(message5) on the xooDataContainer object 1310(5) (step t5). This operation in turn causes the object 1310(5) to invoke an operation xooMessage( ) to create message5, a xooMessage object 1110(5) (step t6). Steps t5 and t6 combined put the xooDataContainer object 1310(5) into the message5 to prepare to send message5 with that object 1310(5).

Subsequently, the xooDestinationXmit object 1232(2) invokes the send( ) operation on the xooProtocol object 1130(5) (step t7), which transmits the message5 (xooMessage object 1110(5)) to the application 2100. After transmission of message5, the xooDestinationXmit object 1232(2) invokes the journal( ) operation to journal the processing state following the successful transmission (step t8). The journal( ) operation has two arguments, xoo_DS_PHASE_XMIT and fileName. The first specifies that the data state being journaled in the xooDataState object 1710(5) is for the phase 2 of the destination transmission operation. The second argument identifies the filename corresponding to the xooDataContainer 1310(5).

Throughout the above description of the preferred implementation, other implementations and changes to the preferred implementation were discussed. Thus, this invention in its broader aspects is therefore not limited to the specific details or representative methods shown and described.

We claim:

1. A work station for interposition in a data network between a plurality of data generating systems and a plurality of application systems and independent of said data generating systems and said application systems, said work station communicating data between said plurality of data generating systems and said plurality of application systems and including a data network application comprising one or more source data collection and safestoring components connected to the plurality of data generating systems for collecting data from the data generating systems and for creating container objects to contain the data collected from each data generating system based upon that each data generating system, the addition of another data generating system causing the creation of additional objects, one or more source processing components for identifying, from the container objects, a selected one of the application systems, one or more destination processing components for processing the container objects to create objects specific to the processing conditions of the selected one of the applications systems, and one or more destination transmission components for transmitting data corresponding to the objects specific to the processing conditions of the selected one of the applications systems to that selected one of the applications systems.

2. A workstation in accordance with claim 1 wherein said source processing component includes means for decompressing and decrypting the collected data.

* * * * *